(12) United States Patent
Lee et al.

(10) Patent No.: US 11,039,584 B2
(45) Date of Patent: Jun. 22, 2021

(54) PLANT GROWTH CONTROL SYSTEM

(71) Applicant: ROCKWOOL International A/S, Hedehusene (DK)

(72) Inventors: Andrew Wreathall Lee, Yorkshire (GB); Paul Jacques Louis Hubert Bouwens, Vught (NL)

(73) Assignee: ROCKWOOL INTERNATIONAL A/S, Hedehusense (DK)

( * ) Notice: Subject to any disclaimer, the term of this patent is extended or adjusted under 35 U.S.C. 154(b) by 153 days.

(21) Appl. No.: 16/315,325

(22) PCT Filed: Jul. 3, 2017

(86) PCT No.: PCT/EP2017/066526
§ 371 (c)(1),
(2) Date: Jan. 4, 2019

(87) PCT Pub. No.: WO2018/007334
PCT Pub. Date: Jan. 11, 2018

(65) Prior Publication Data
US 2019/0307087 A1    Oct. 10, 2019

(30) Foreign Application Priority Data
Jul. 4, 2016    (EP) .................................... 16177823

(51) Int. Cl.
*A01G 31/02*    (2006.01)
*A01G 24/22*    (2018.01)
(Continued)

(52) U.S. Cl.
CPC ............. *A01G 31/02* (2013.01); *A01G 24/22* (2018.02); *A01G 25/167* (2013.01); *G05B 15/02* (2013.01);
(Continued)

(58) Field of Classification Search
CPC ................................ A01G 31/02; G05B 15/02
See application file for complete search history.

(56) References Cited

U.S. PATENT DOCUMENTS 8,615,221 B1 * 12/2013 Cosenza ............. H04W 68/005
455/414.1
2010/0306012 A1    12/2010 Zyskowski
(Continued)

FOREIGN PATENT DOCUMENTS

CA    2915442 A1 *  1/2015 ............. A01G 25/16
RU    2146442 C1    3/2000
(Continued)

OTHER PUBLICATIONS

International Search Report and Written Opinion dated Sep. 28, 2017 for corresponding International Application No. PCT/EP2017/066526.
(Continued)

*Primary Examiner* — Santosh R Poudel
(74) *Attorney, Agent, or Firm* — Tarolli, Sundheim, Covell & Tummino LLP

(57) ABSTRACT

A system (10,11) for controlling plant growth conditions in hydroponic growing systems, the system for controlling plant growth conditions comprising: at least one detector (7,1101) for measuring at least one property of a plant growth substrate; first (9,1103) and second (9,12, 1107) data processing means; data storage means (1120); and the or each detector (7,1101) being arranged to measure a property or properties of a plant growth substrate and to transmit a detector identifier and the measured property or properties over a communications link to the first data processing means; the first data processing means (9,1103) being arranged to: hold in a memory predefined irrigation data defining a relationship between: plural values for one or more of temperature, pH level, water content, nutrient
(Continued)

content, oxygen content, and plant parameters of the substrate; and plural desired irrigation parameters; process measured properties received from each detector to obtain processed properties of the substrate; provide an output indicative of a desired irrigation input for the growth substrate, based upon the processed properties and the predefined irrigation data; and send processed data to the data storage means (1120), the data storage means arranged to store the sent data as logged data; the second data processing means (9, 12, 1107) being arranged to: receive data from the data storage means (1120); calculate predicted properties of the substrate based on the logged data; determine a difference between the processed properties of the substrate and the predicted properties of the substrate; receive an alert condition input for outputting an alert based on said difference; and output an alert when said difference meets the alert condition.

19 Claims, 12 Drawing Sheets

(51) Int. Cl.
    *G05B 15/02*        (2006.01)
    *A01G 25/16*      (2006.01)

(52) U.S. Cl.
    CPC ....... *G05B 2219/2625* (2013.01); *Y02P 60/21* (2015.11)

(56) References Cited

U.S. PATENT DOCUMENTS

| | | | |
|---|---|---|---|
| 2012/0198372 A1* | 8/2012 | Kuhlke | G06F 3/01 715/767 |
| 2014/0115958 A1 | 5/2014 | Helene | |
| 2015/0040473 A1 | 2/2015 | Lankford | |
| 2015/0100168 A1* | 4/2015 | Oliver | A63F 13/235 700/284 |
| 2015/0164009 A1* | 6/2015 | Chandran | G05B 15/02 700/284 |
| 2015/0373936 A1* | 12/2015 | Bouwens | A01G 25/16 47/59 S |
| 2016/0143228 A1* | 5/2016 | De Groot | A01B 79/005 700/284 |
| 2016/0371830 A1* | 12/2016 | Barrasso | G06K 9/00 |
| 2017/0208757 A1* | 7/2017 | Valmont | B01F 5/0206 |

FOREIGN PATENT DOCUMENTS

| | | |
|---|---|---|
| RU | 78401 U1 | 11/2008 |
| WO | 2015001083 A1 | 1/2015 |
| WO | 2015092800 A1 | 6/2015 |

OTHER PUBLICATIONS

Extended European Search Report dated Jan. 12, 2017 for corresponding EP Application No. 16177823.8.

* cited by examiner

PLANT GROWTH CONTROL SYSTEM

RELATED APPLICATIONS

The present application is a U.S. National Stage application under 35 USC 371 of PCT Application Serial No. PCT/EP2017/066526, filed on 3 Jul. 2017; which claims priority from EP Patent Application No. 16177823.8, filed 4 Jul. 2016, the entirety of both of which are incorporated herein by reference.

FIELD OF THE INVENTION

The present invention relates to the growth of plants in hydroponic growing systems, including artificial substrates. In particular, but not exclusively, the present invention relates to a system and method for controlling plant growth conditions, more particularly plant growth conditions in mineral wool substrates used for plant growing.

BACKGROUND TO THE INVENTION

Hydroponic growing systems are known in the art for the purpose of growing plants using mineral nutrient solutions, without soil (i.e. soilless cultures). Plants in hydroponic growing systems may be grown in substrates of various types, such as mineral wool, glasswool, cocopeat (coir), or peat slabs, for example.

It is known that plants can be grown in mineral wool growth substrates. Such growth substrates are typically provided as a coherent plug, block, slab or mat/blanket and generally include a binder, usually an organic binder, in order to provide structural integrity to the product.

Typically, the growth process of the plant is managed in two stages: a first stage managed by a "propagator" in which the plant is grown from seed; and a second stage managed by a "grower" during which the plant is sustained and any harvest taken. For example, in the case of the tomato plant, the propagator may plant individual tomato seeds in cylindrical plugs having a thickness in the order of 25-30 mm and a radius of around 20-30 mm. After germination of the seed, the propagator places the plug within a cuboid block to allow further growth of the root system and the plant. The individual plant within the block is then nursed until a stage when it can be transferred from the propagator to the grower.

Although often only a single plant is provided in each block, it is possible for multiple plants to be provided in a single block. In some examples, a single plant in a block is split into two by splitting a stem during an early phase of growth, resulting in two plants sharing a single root system. In another alternative, multiple plants may be grafted together and grown within a single block.

The use of a separate plug and block by the propagator is not essential for all plants, but has been described, for example, in European patent application EP2111746, as providing a number of advantages. In particular, the small size of the plug allows more regular watering of the plant in the initial stage without saturating its substrate.

After they are received from the propagator, the grower places a number of blocks on a single slab of mineral wool to form a plant growth system. The slab of mineral wool is typically encased in a foil or other liquid impermeable layer except for openings on an upper surface for receiving the blocks with the plants and a drain hole provided on the bottom surface.

During subsequent growth of the plant, water and nutrients are provided using drippers which deliver a liquid containing water and nutrients to the system either directly to the blocks or to the slabs. The water and nutrients in the blocks and slabs is taken up by the roots of the plants and the plants grow accordingly. Water and nutrients which are not taken up by the plant either remain in the substrate system or are drained through the drain hole.

There is a desire to use water and nutrients as efficiently as possible during the growing process. This is both for cost and environmental reasons. In particular, the nutrients are expensive to obtain, while waste water containing such nutrients is difficult to dispose of due to environmental legislation. These pressures will increase as raw materials (particularly fertilisers such as phosphates) become increasingly scarce. The desire to avoid such waste is matched by a desire to improve plant growth conditions, and thereby to increase the yield and quality of fruit obtained from plants in this manner.

A hydroponic growing systems (e.g. a greenhouse) environment may be controlled by a climate control computer configured to adjust factors such as hours of sunlight, wind speed, or wind direction for example. The climate control computer may also monitor the plant growth, plant health, water and nutrient content in a substrate. It is known to measure the water and/or nutrient content within a plant growth substrate. Although known systems and devices can provide useful information about agricultural soil composition and can help with the automation of irrigation of the soil, they do not however provide solutions for effective management of water and water/nutrient distribution in hydroponic growing systems such as mineral wool substrates.

European patent application EP3016492 provides a solution for efficient management of water and nutrient distribution in hydroponic growing systems. When using such a system, growers adopt an irrigation strategy (which represents the amount of nutrients and water to be provided to a system), monitor the system and then adjust the irrigation level based on measurements of water content or nutrients for example. A problem with this approach, however, is that the irrigation strategy is not adjusted in a timely manner and the target levels (e.g. water or nutrients) are reached either too early or too late.

There is a continuing requirement to improve upon the systems available to a user for managing the irrigation of plants during plant growth in hydroponic growing systems. In particular, it is desirable to improve control of growth conditions in response to rapidly changing factors such as environmental factors or changes to plants, substrates or other materials used in the system.

SUMMARY OF THE INVENTION

In addressing the drawbacks of the prior art, the present invention provides a system for controlling plant growth conditions in hydroponic growing systems, the system for controlling plant growth conditions comprising:
  at least one detector for measuring at least one property of
    a plant growth substrate;
  first and second data processing means;
  data storage means; and
the or each detector being arranged to measure a property or properties of a plant growth substrate and to transmit a detector identifier and the measured property or properties over a communications link to the first data processing means;
the first data processing means being arranged to:

hold in a memory predefined irrigation data defining a relationship between:

plural values for one or more of temperature, pH level, water content, nutrient content, oxygen content, and plant parameters of the substrate; and plural desired irrigation parameters;

process measured properties received from each detector to obtain processed properties of the substrate;

provide an output indicative of a desired irrigation input for the growth substrate, based upon the processed properties and the predefined irrigation data; and send processed data to the data storage means, the data storage means arranged to store the sent data as logged data;

the second data processing means being arranged to:

receive data from the data storage means;

calculate predicted properties of the substrate based on the logged data;

determine a difference between the processed properties of the substrate and the predicted properties of the substrate;

receive an alert condition input for outputting an alert based on said difference; and output an alert when said difference meets the alert condition.

It will be appreciated that the system is appropriate for hydroponic systems in the propagating as well as growing stages as described above; in other words the system may be used by propagators as well as growers.

Advantageously, the control system according to the invention provides users (e.g. propagators or growers) with the ability to exercise optimum control over their crops at crucial moments during cultivation. This is enabled by outputting an alert to the user when the irrigation strategy must be changed to ensure that predicted properties of the substrate may be reached in a timely manner.

Data is obtained from detectors deployed in the site and transmitted to a first data processing means. In preferred embodiments, the detectors are wireless sensors. Data is then sent from the first data processing means to a data storage means such as a cloud and stored over time as logged data. In some embodiments, the data storage means and the first data processing means may be part of a single unit or device, which may be referred herewith as a 'smartbox'. In other embodiments, the data storage means and the first data processing means may be part of a cloud service for example. It will be appreciated that the functionalities of the first and second data processing means may be achieved for example by the same unit or cloud service.

A second data processing means which may be a PC or smartphone for example, then calculates predicted properties of the substrate based on the logged data. By a 'predicted property' we mean an indication of a property expected based on the logged data. For example, the water content reached by a grower's section in a particular day may be predicted from the water content achieved on a previous day if the weather conditions stay the same. Once stored on the cloud, the logged data may be analysed by any analytical means.

In particular, an alert is triggered when there is a difference between the processed and predicted values and that difference meets an alert condition, e.g. is within a predetermined range or above a predetermined threshold, which may be set by a user. For example, alert triggers may be set by a user inputting 'setpoints' which represent desired values or properties of a system (also referred to as targets). By setting one or more of such alerts, a user is able to create customized irrigation strategy quickly and more efficiently than in existing systems.

A processed property may relate to a directly measured property such as temperature or to a calculated property such as nutrient content, based on sensor data. By a predicted property we mean an indication of a property based on logged data, for example data stored on a cloud. In other words, the predicted value is based on a value obtained at an earlier time for a similar set of conditions.

In preferred embodiments, the processed properties and predicted properties are displayed for example in a graphical user interface enabling a user to visually compare them and thus make quick decisions and obtain quick feedback on the consequences of these decisions. The graphical user interface may belong to an application run on a PC or a mobile device referred to as a 'portable communication device', such as a smartphone, tablet etc. For example, the processed and predicted properties may be displayed next to (i.e. curves plotted alongside) each other in a graphical user interface. In particular, decisions of the user relate to adjusting the alert trigger levels and/or irrigation strategy. The interaction between the user and the graphical user interface enables a more flexible and accurate control of growth conditions, which can be easily and centrally reconfigured in response to new data or in response to other influencing factors such as environmental factors or changes to plants or substrates or other materials used in the system.

In preferred embodiments, the level of difference at which the alert is triggered, i.e. the predetermined range or threshold within which the difference warrants an alert, may be adjusted by the user. Advantageously, this level of flexibility improves control and may enhance user experience.

The second detector data processing means may be arranged to adjust the input indicative of an alert trigger. This allows system personnel to upload setpoints and calculations to a grower's irrigation control system so that a user is automatically advised on the best irrigation strategy. Advantageously, the optimum setpoints and calculations may be obtained by an analytical evaluation of data (e.g. graphs and calculated values) collated for a system over time, as part of the logged data.

The portable communication device in the system may be a smartphone or tablet for example which comprises the second data processing means. Accordingly, the portable detector communication device is advantageously suitable to run an application for controlling plant growth. Alternatively, the portable communication device may be a dedicated 'handheld' device in communication with a receiver. The receiver may also transmit data directly to the data storage means.

When the portable communication device is in communication with the detectors, it may be referred to as a 'portable detector communications device'. A portable communication device in the system additionally allows checks and testing of individual components of the system to be carried out and allows easier set-up of the system since a user can place detectors out in the growth area and check outputs without a need to return to a central computer or processing device to check on or update configuration and performance of the system. One or more detectors may be used in the system and preferred embodiments may include 1 to 3 detectors or more. Advantageously, the system may be deployed wirelessly in the monitored area as will be described in more detail below.

The portable communication device may be arranged to control an irrigation input to a plant growth substrate based upon the output indicative of a desired irrigation input. The 'output indicative of a desired irrigation input' refers to input parameters for the growth substrate provided by the first detector data processing means of the system. For example, the irrigation input parameters may be an input in a climate control computer of a hydroponic system. In other words, not only can the system determine whether a target desired will be reached in time and recommend changes in strategy, but the recommendation can be automatically acted upon by changing the irrigation strategy of the climate computer.

In preferred embodiments, the transmittal by a detector of data to the first detector data processing means is performed at a time interval less than 10 minutes, preferably less than 5 minutes, more preferably less than 3 minutes. This enables timely monitoring and control the irrigation strategy. Additionally, the detector may directly transmit data to the second detector data processing means or the data storage means.

Accordingly, the present invention may use properties such as temperature (i.e. root temperature), water content, and nutrient content, determining electrical conductivity of fluid in the substrate, for example, to accurately determine nutrient content in the artificial substrate as opposed to individual element levels. 'Nutrient content' also refers to individual nutrient content which may be measured by a sensor for example.

Unlike existing systems, therefore, the present invention provides a flexible solution to control the water waste problem specific to soilless cultures of hydroponic systems. As discussed above, substrates in hydroponic systems often have fixed water volumes, unlike soils and transport in soils, in which water can spread out over an unlimited substrate volume, in any direction. The fixed water volumes of hydroponic systems are typically around 1-30 litre per $m^2$, most commonly between 4-15 litre per $m^2$. Per plant, the fixed water volumes are typically between 0.5-10 litre. The fixed water volumes in hydroponic systems are also rather small when compared to the rooting areas of plants in soil.

Soilless substrates in hydroponic systems may be located on top of the soil, on concrete floors, on gutters, moving tables etc. The relatively smaller water volumes in combination with growing out of soil makes it possible for growers to collect the excess of water, disinfect the water and re-use the water to apply new nutrient solutions. The amount of water drained is relatively small (e.g. 0 to −60 $m^3$ per ha on a summer day). With existing disinfection systems (using e.g. pumps specific for this purpose) the collected drained water can be disinfected typically within 24 hours, so that it is ready for use the next day.

In artificial substrates, for example, the suction pressure applied by plants for water uptake is commonly in the range between pF 0 and 2, most common between pF 0 and 1.5. Although water uptake by plants in this range is unlimited, differences in this range can determine differences in dry matter distributions in plants. In contrast, in agricultural soils, normal pF ranges are between pF 2 and pF 4.2 (applied suction pressure by plants is between 100 and 16000 atm). In this range we talk about water availability for plants rather than effects on distribution of dry weight.

A portable communication device may be further arranged to: receive detector data from a detector of the system; and transmit detector data to the first detector data processing means. This can allow a user to check detector data relating to an output or of a status of a detector in the growing area and further forward the received data to the first detector data processing means to store data for later analysis, or to update inputs or configuration data to the system after correction, or updating of, installation or configuration of components of the system.

The first detector data processing means may be further arranged to: process the measured properties received from each detector to determine a nutrient content of a substrate associated with each detector; and provide an output indicative of a desired irrigation input for the growth substrate, based upon the calculated nutrient content of the substrate. Steering irrigation input based upon nutrient content is not known since other inputs are generally used, such as detected radiation or detected water levels. The use of nutrient levels to steer irrigation reflects a recognition that, at least at times, the water content level should not be maintained at a certain point if it has a detrimental effect on nutrient level. For example, when a deliberate effort is undertaken to reduce the water content level within a substrate, there is a risk that an increased nutrient level will result. It has therefore been recognised as inappropriate to ignore nutrient level when enacting control of the water content level. In preferred embodiments, a property indicative of nutrient content is the electrical conductivity of fluid in the growth substrate.

The portable communication device may further be configured to: receive a detector identifier from a detector of the system; receive detector data relating to the detector; and transmit the detector identifier and the detector data to the first data processing means, also referred to as a 'central detector processing means'. This allows flexible input of detector data to central processor means of the system without a need to be present at the central detector data processor means, so that configuration can be carried out more efficiently out in the growing area.

The portable communication device may be further configured to: receive, by user input, user defined detector data; associate the user defined detector data with the detector identifier; and transmit the detector identifier and the user defined detector data to the first detector data processing means. Inputting user data allows a user to define data for a detector and transmit the data to the first detector data processing means for a remote location, so that configuration can be carried out more efficiently out in the growing area.

The data associated with the detector identifier may include any or all of: location data of the detector; a power status of the detector; a status of a communication link between the detector and the first detector data processing means; information indicating a type and/or size of the growth substrate measured by the detector; and/or a property or properties of the growth substrate measured by the detector. Some or all of the above data may be either transmitted by the detector or input to the portable detector communication device by a user.

The portable communication device may be further configured to: receive measured properties from the detector; associate the measured properties with the detector identifier of the detector; and transmit the detector identifier and associated measured properties to the first detector data processing means of the system. This can allow a user to check detector outputs in the growing area and further forward them to central processing means to store data for later analysis, or to update inputs or configuration data to the system after correction or updating of installation or configuration of components of the system.

The portable communication device may further comprise location determining means, for determining location data of the device or a detector, and being further configured to: associate the identifier of the detector with determined location data; and transmit the detector identifier and associated location data to the first detector data processing means of the system. This allows locations of the detector or detectors of the system to be sent to the first detector data processing means without the need to return to the first detector data processing means.

The invention further provides a method of controlling plant growth conditions using a system according to the invention.

The method may further comprise inputting the alert condition input into the portable communication device running an application according to the invention as described above.

A portable communication device is also provided, adapted to be used in a system according to the invention, for example a smartphone or a dedicated handheld device. Preferably, in use, the portable communication device forms part of the system according to the invention.

The invention further provides a computer program product, loadable into a memory of an electronic communication device, and containing instructions which, when executed by the electronic communication device, cause it to be configured as the claimed portable detector communication device.

The invention further provides a platform for data analysis for processing logged data used in a system according to the invention. Advantageously, this enables users to receive expert advice based on analysed data.

A number of factors monitored by detectors of the system may be influential, either alone or in combination with the nutrient level, and those factors may vary across a large plant growing system. The system of the present invention enables a user to implement a low cost system and to quickly and easily redeploy the equipment or detectors to different areas of the greenhouse or other growing area so that conditions can be monitored in multiple areas quickly and easily without the need to buy new equipment for each area.

The present invention thus provides for a quick, flexible, feedback system that can be used to closely and reliably monitor the nutrient level in the slab and control the applied water in dependence on this level. This enables the environment of each plant to be controlled in a timely manner, providing the maximum outcome for a given supply of water and/or nutrients.

The benefits of improved control of distribution of water and/or nutrients are particularly significant during an early stage when a plant-containing block is newly placed on the slab. At this point it is important that the first layer contains enough water and nutrients to secure a good rooting within the slab. This allows positive root development to secure optimal and healthy plant growth. Beneficially, not only does the slab of the present invention allow sufficient water and nutrients to be provided, but it also allows the level water and nutrients in the vicinity of the roots to be closely controlled. This can help to avoid over-feeding the plant which can reduce the growth of fruit and/or vegetables.

The system of the present invention can be used in any plant growth system (by propagators and growers alike) and can be implemented with essentially any plant growth substrate, which may comprise natural or man-made materials and which may be implemented in a managed environment such as a greenhouse, in plastic tunnels or in an external environment. The benefits of the invention can be realised in essentially any agricultural or horticultural application where the growth conditions described herein are to be monitored.

BRIEF DESCRIPTION OF THE DRAWINGS

Preferred embodiments of the present invention will now be described with reference to the accompanying drawings, in which.

DETAILED DESCRIPTION

Figure 1:
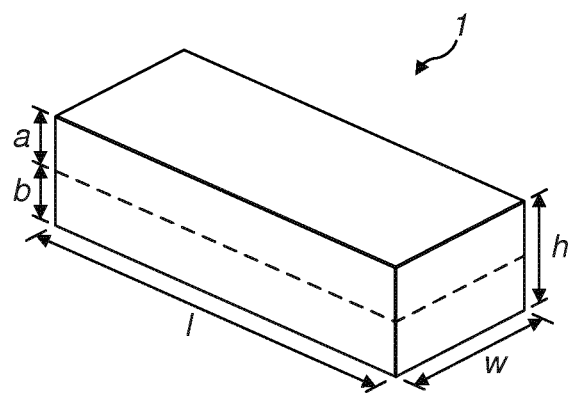
FIG. 1 illustrates a slab used for plant growth.

Referring to FIG. 1, there is shown a mineral wool slab 1 having a first layer of a first density disposed above a second layer of a second density. The slab 1 has a volume of 6.8 litres, although more generally for preferred embodiments the volume may be in the range of 3 litres to 20 litres, more preferably in the range 5 litres to 15 litres, and most preferably in the range 5 to 11 litres. Some slabs may have a volume in the range 6 litres to 8 litres. Alternatively, the volume may lie in the range of 3 litres to 15 litres, or 3 litres to 10 litres, for example. An alternative preferred slab has a volume of 9 litres. The slab may comprise multiple layers, including a bottom layer and a top layer, whose growth conditions may vary relative to one another.

As is the case in the embodiment shown in FIG. 1, it is preferable that the height of the bottom layer is greater than that of the top layer. For example, the ratios between the heights of the top and bottom layers may be 1:(1-3), or preferably 1:(1.2-2.5). More preferably, this ratio is 1:(1.2-1.8).

The use of two differing densities in the slab of the preferred embodiment, together with its relatively small size, have been found to assist in the retention of water and nutrients and also ensuring that these are distributed substantially uniformly throughout the slab.

Figure 2:
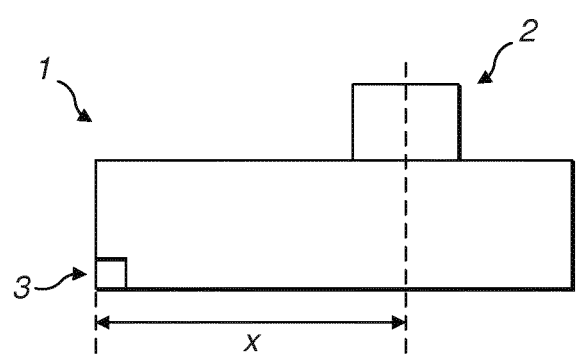
FIG. 2 illustrates a plant growth system comprising a block together with the slab of FIG. 1.

Referring now to FIG. 2, the slab 1 is shown with a block 2 positioned on its upper surface. The slab 1 further comprises a liquid impermeable covering around the mineral wool, the covering having two openings. Firstly, there is an opening on the upper surface to allow contact between the mineral wool of the slab 1 and the block 2. Secondly, there is an opening on a lower surface which acts as a drain hole 3.

The block 2 and the slab 1 are preferably formed of the same or a similar material. Thus the description below regarding the material of the slab 1 may equally be applied to the block 2. In particular, the block 2 may comprise stone wool and the binders and/or wetting agents described below.

The block dimensions can be chosen depending upon the plant to be grown. For example, the preferred length and width of a block for pepper or cucumber plants is 10 cm. For tomato plants, the length is increased to 15 cm or even 20 cm. The height of the blocks is preferably in the range of 7 to 12 cm, and more preferably in the range of 8 to 10 cm.

Therefore, preferred dimensions for pepper and cucumber range from 10 cm*10 cm*7 cm to 10 cm*10 cm*12 cm, and more preferably from 10 cm*10 cm*8 cm to 10 cm*10 cm*10 cm.

Figure 3:
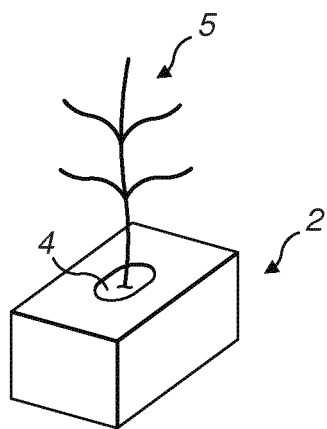
FIG. 3 illustrates the block of FIG. 2 together with a plug and a plant.

FIG. 3 illustrates a plant 5 in position within a plug 4 disposed within a block 2, such as that shown in FIG. 2. Like the block 2, the plug 4 is typically formed of a mineral wool with a binder and/or wetting agent as described below in the context of the slab 1.

In some embodiments, the plug 4 is not provided, and the seed is disposed directly within a hole in the block, from which the plant 5 subsequently grows. An example of a plant for which this approach is taken is the cucumber.

Preferably, the plant 5 is fruit or vegetable plant, such as a tomato plant or the like. Alternatively, the plant may be a cucumber, aubergine or sweet pepper plant for example. The present invention can assist in increasing the yield of fruit or vegetables from a plant and may also increase the quality of that fruit or vegetable by increasing the accuracy of the control of the growth conditions of the substrate in which the plant is growing.

As mentioned above, the slab 1 is preferably a mineral wool slab. The mineral fibres employed may be any man-made vitreous fibres (MMVF), such as glass fibres, ceramic fibres, basalt fibres, slag wool, stone wool and others, but are usually stone wool fibres. Stone wool generally has a content of iron oxide at least 3% and content of alkaline earth metals (calcium oxide and magnesium oxide) from 10 to 40%, along with the other usual oxide constituents of mineral wool. These are silica; alumina; alkali metals (sodium oxide and potassium oxide) which are usually present in low amounts; and can also include titania and other minor oxides. In general the product can be formed of any of the types of man-made vitreous fibre which are conventionally known for production of growth substrates.

The mineral wool is typically bound by a binding system which comprises a binder composition and additionally a wetting agent.

Figure 4:
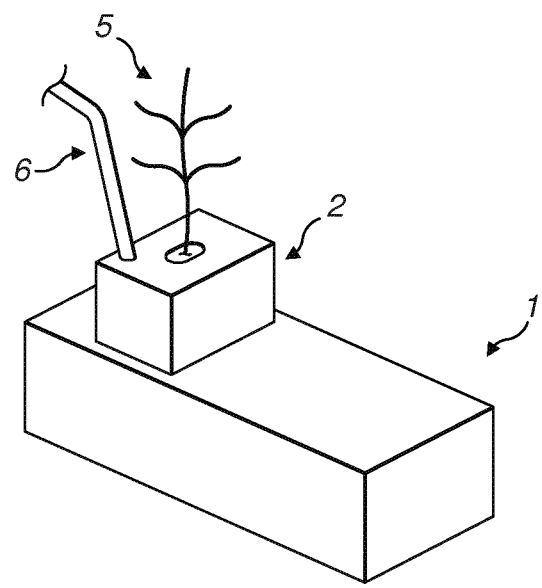
FIG. 4 illustrates a irrigation device in place next to the plant growth system of FIG. 2.

FIG. 4 shows a plant growth system comprising the slab 1, block 2 and plug 4 of FIGS. 1 to 3 and an irrigation device. The irrigation device 6 is arranged to provide a solution of water and nutrients to the system, either directly to the block or to the slab. Preferably, the irrigation device is arranged to provide water and/or nutrient solution directly to the block 2. Since the block is disposed away from the drain hole 3 (as described above with reference to FIG. 2), solution from the irrigation device must pass more than 50% of the distance along the slab 1 before reaching the drain hole 3. Alternatively, the irrigation device may provide the water and nutrient solution to the slab 1 directly, but it is preferably arranged to do so either adjacent to the block or at a distal side of the block 2 relative to the drain hole 3.

The irrigation device 6 may be connected to separate nutrient and water reservoirs, and may be controlled to select the appropriate proportions of nutrients and water. Alternatively, a single combined nutrient and water reservoir may be provided such that the irrigation device provides liquid to the system having the same proportions of water and nutrients as are found in the reservoir.

The control of the irrigation device may be advantageously effected using a control system or method in accordance with embodiments of the present invention. The control system may control the irrigation devices providing nutrients and water to a plurality of plant growth systems each comprising a slab 1 upon which a plant-containing block 2 is placed. The control system may be controlled on the basis of the detected water nutrient levels in one or more of the slabs, as described in EP2953447A which is incorporated herewith by reference. Additional control may be carried out on the basis of detected water content levels and/or temperatures in one or more slabs.

Figure 5:
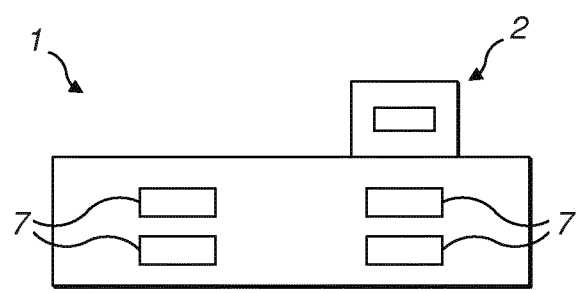
FIG. 5 illustrates the location of water and nutrient detectors on the plant growth system of FIG. 2.

The locations of the detectors 7 used to detect these levels in one embodiment are illustrated in FIG. 5. Examples of preferred detectors are described in EP2953446A which is incorporated herewith by reference. The detectors will typically comprise a body portion together with one or more, usually three or six probes, which extend from the body into the slab. The probes are typically made from stainless steel or another conductive material, and are used to measure the water content and/or electrical conductivity (EC) levels of the substrate by analysing the substrate's temperature, resistance and/or capacitance. The EC levels can be used to infer the nutrient level within the solution in the slab 1 as they reflect the ionic content of that solution.

Preferably, the EC level is maintained in the range 1.0 mS/cm to 812 mS/cm, more preferably in the range 2 mS/cm to 7 mS/cm. The preferred EC levels may be chosen according to crop type. If EC is to low (e.g. less than 1.0 mS/cm) the plant will starve for nutrients. If EC is in the range 2 mS/cm to 3.5 mS/cm, this will maximize production quantity. If EC is slightly higher this will result in better fruit quality (e.g. EC in the range 3.5 mS/cm to 5 mS/cm). If the EC is too high (for example, over 5 mS/cm for pepper and cucumbers or over 12 mS/cm for tomato) this will lead to fruit quality problems like Blossom End Rot. High EC implies that there will be high levels of Sodium and Chlorine in the substrate which can lead to a yield loss and need to discard the water from the greenhouse.

In prior art systems, the detectors 7 are placed on the upper surface of the slab 1, with the probes extending vertically through the slab. This approach is intended to provide a measurement which reflects the overall water or nutrient content across the vertical extent of the slab 1. However, in practice, such probes typically return results which are disproportionally influenced by the conditions in one or more areas of the slab 1, such as in the top portion of the slab. One reason this disparity can arise is because of variation in the EC level across the slab 1, which clearly affects the measured electrical properties such as resistance and/or capacitance from which, for example, the water content is calculated.

Further difficulties arise in prior art approaches due to the number of blocks 2 usually placed on a slab 1. It is often difficult to find positions on the slab 1 which are functionally equivalent for each block 2, particularly given the potential asymmetry in the system caused by the location of the drain hole 3 at one end of the slab 1.

In the system of the present invention, these difficulties can be overcome. In particular, FIG. 5 shows that the detectors 7 are disposed on the side of the slab 1 (i.e. the body portion of the detector 7 is disposed against a vertical face of the slab and the probes extend horizontally). This approach is available because of the improved water content and EC distributions within the slab 1.

Since these are substantially uniform in the slab 1 of the preferred embodiment, the horizontal extent of the probes provides an accurate reading.

Indeed, while the slab 1 of FIG. 5 is illustrated with a plurality of detectors 7, this is not the case in all preferred embodiments. The array of detectors 7 shown in FIG. 5 allows measurement of the water content distribution and EC distribution, and has been used to analyse the slab 1 characteristics, providing results such as those detailed below. However, in practice it is found that only a single detector 7 may be required per slab, and detectors may be distributed around different slabs in a growing area to gain an illustrative indication of overall growth conditions for the area. This detector 7 preferably comprises horizontally extending probes located at a position offset from the block towards the drain hole 3.

Figure 6:
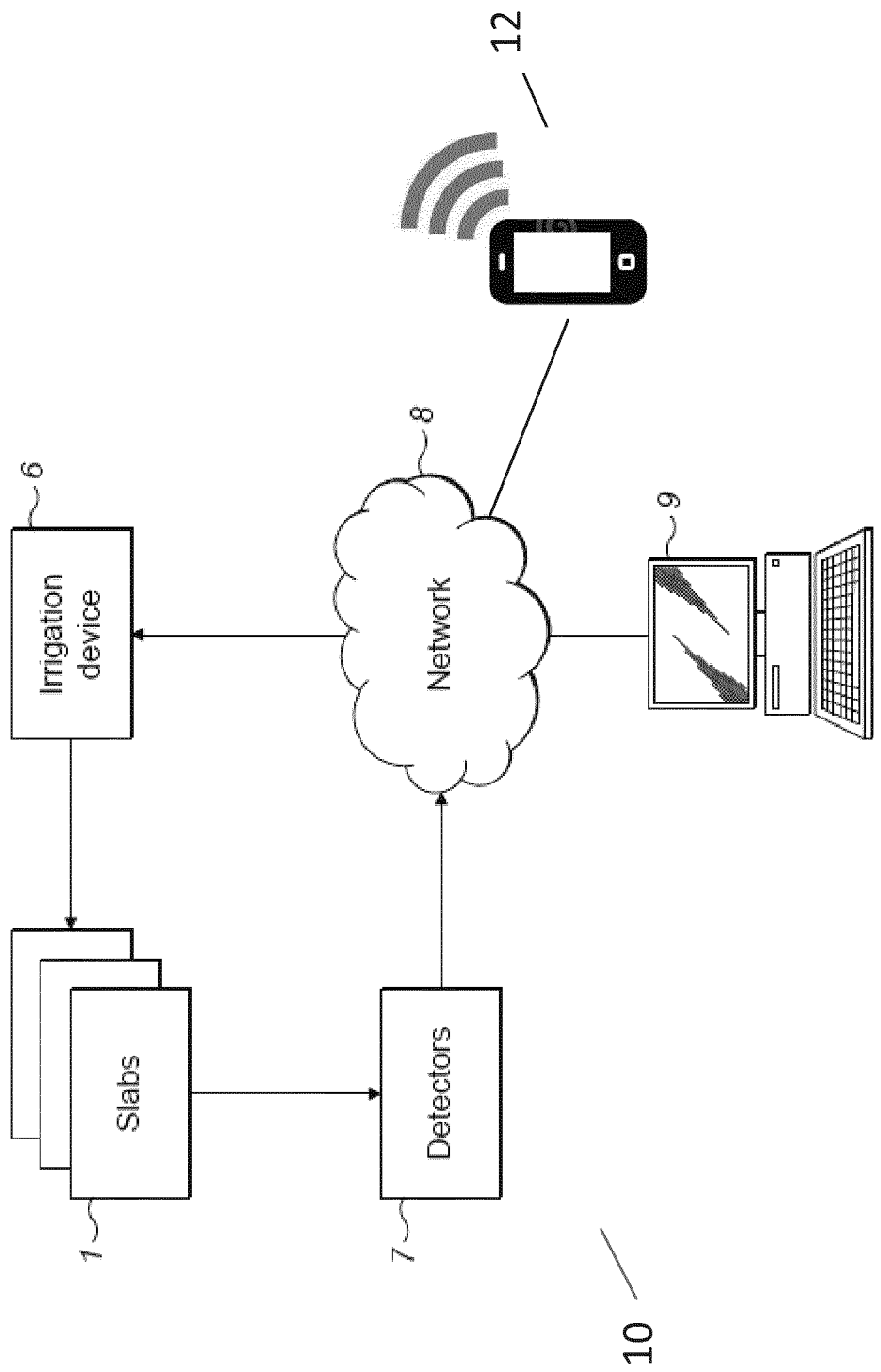
FIG. 6 shows schematically a plant growth control system comprising elements of the present invention.

The detectors 7 can be used to control the quantity of water and/or nutrients provided to the slab 1 by using a control system 10 such as that illustrated in FIG. 6, as described in EP3016492A1 which is incorporated herewith by reference. The control system may also vary the concentration of nutrients within the solution provided by the irrigation devices 6 to the slabs 1. As can be seen from FIG. 6, the detectors 7 observe the data in the slabs 1, and communicate this across a network 8 to a control unit 9 and a portable communication device 12 such as a mobile phone, smartphone, tablet or a similar device in communication with the network. The data is uploaded to a database such as a cloud service. The control unit then drives the irrigation devices (drippers) 6 across the network 8 in order to provide water and nutrients to the slabs 1. The control unit 9 can be programmed with a desired irrigation strategy and can automatically ensure that the irrigation is carried out to control the nutrient levels in the slab 1 and may also control the water content levels in this manner. In this way, an automatic control of the irrigation process to provide a desired result is achieved.

The system may comprise one or more portable communication device(s) 12, such as a smartphone, tablet or the like, and/or a dedicated 'handheld' device in combination with a receiver (not shown) as will be described in relation to FIG. 7. The portable communication device 12 or a PC connected to the network for example may be configured to run an application performing a control method as will be described in more detail below.

Typically, each control system will comprise a large number of slabs 1. There may be detectors 7 placed on every slab 1, or there may be detectors placed on a selection of the slabs 1 to provide representative results. The detectors 1 are fixedly mounted to the slabs 1, in order that they can provide results to the control unit 9 at regular intervals. For example, the detectors may provide results at intervals of one minute, five minutes or another suitable time period. This allows the slabs 1 within the system to be constantly or periodically monitored so that they can be irrigated appropriately.

The irrigation devices 6 of the system may be controlled to apply a specific irrigation strategy. For example, such a strategy may comprise a number of distinct phases, designed to steer plants through generative and vegetative growth. As is understood in the art, generative growth refers to a type of growth in which the production of flowers/fruit is encouraged, while during vegetative growth the plant a higher proportion of leaves and other green elements are produced. Generative growth is encouraged when a plant has a relative lack of water a, while vegetative growth is encouraged by a plentiful supply of water. Vegetative growth produces the higher increase in overall biomass of the plant, while generative growth increases the proportion of the growth which contributes to the production of fruit or flowers.

It has been known to take advantage of these different growth types by applying irrigation strategies during which the preferred water content level varies. According to such an irrigation strategy, the plant growth substrate is watered each day in an attempt to reach a desired water content level. The water content of the substrate is measured as a percentage of the water content of the substrate when the substrate is fully saturated. Thus, a value of 0% represents a dry substrate, while a value of 100% represents a fully saturated substrate.

Typically, an irrigation strategy of this type comprises a number of distinct stages. Firstly, prior to placing the block 2 on the slab 1, the slab 1 is typically saturated or near-saturated with water. This helps to ensure that when the block 2 is first placed on the slab 1, root growth into the slab 1 is encouraged. At this point, however, the grower is anxious to ensure that the plant 5 provides fruit as soon as possible. In order to achieve this, the grower aims to impart a 'generative impulse' (i.e. an impulse to initiate generative growth). This is done during a first period of the irrigation strategy, by reducing the desired water content down to a minimum level before increasing it again. The principle is that the reduction of water content will encourage generative growth of the plant and thus the flowering of the plant leading to fruit at the earliest available time.

After the generative impulse is applied, the grower wishes to return the plant to a sustainable phase of predominantly vegetative growth in order to obtain leaves and plant structure which will support the now growing fruit. Thus, towards the end of the first period of the irrigation strategy, the desired water content is increased. The desired water content level is increased until it reaches a sustainable value at which it is held substantially constant during a second period of the irrigation strategy.

In the second period, more vegetative growth is encouraged due to the higher water content in the substrate. The second period corresponds broadly to the summer season, during which the relatively high amount of sunshine causes the plants to transpire at a greater rate. Accordingly, a relatively high proportion of water must be provided to the plants. It should be recognised that although growth may be steered towards vegetative growth during this period more than at other periods, fruit continues to grow, although the rate is controlled by this steering. As the season turns to autumn and then winter, the transpiration rate reduces. As a result, it is no longer necessary to maintain the same water content in the substrate. Moreover, there is at this stage a desire to encourage further fruit growth before the plant reaches the end of the cycle. For both these reasons, the irrigation strategy may comprise a third period in which the water content level is reduced. The rate of reduction is relatively gradual.

The reduction in water content during the third period encourages generative growth in the plant, and thereby extends the season during which useful fruit can be obtained from the plant.

Accordingly, irrigation strategies can be used to attempt to steer the plant between generative and vegetative growth states in order to increase the yield of fruit obtained from the plant. Conventionally, this process has been carried out by driving water content levels within the substrate to desired levels. However, it is now recognised that such control is not sufficient to offer optimum growing conditions. In particular, reduction in water content levels can lead to increased nutrient levels which it has been discovered can inhibit plant growth. Accordingly, in the present embodiments, the level of water provided to the slab is controlled with a dependence on nutrient levels in order to avoid unwanted effects.

Figure 7:
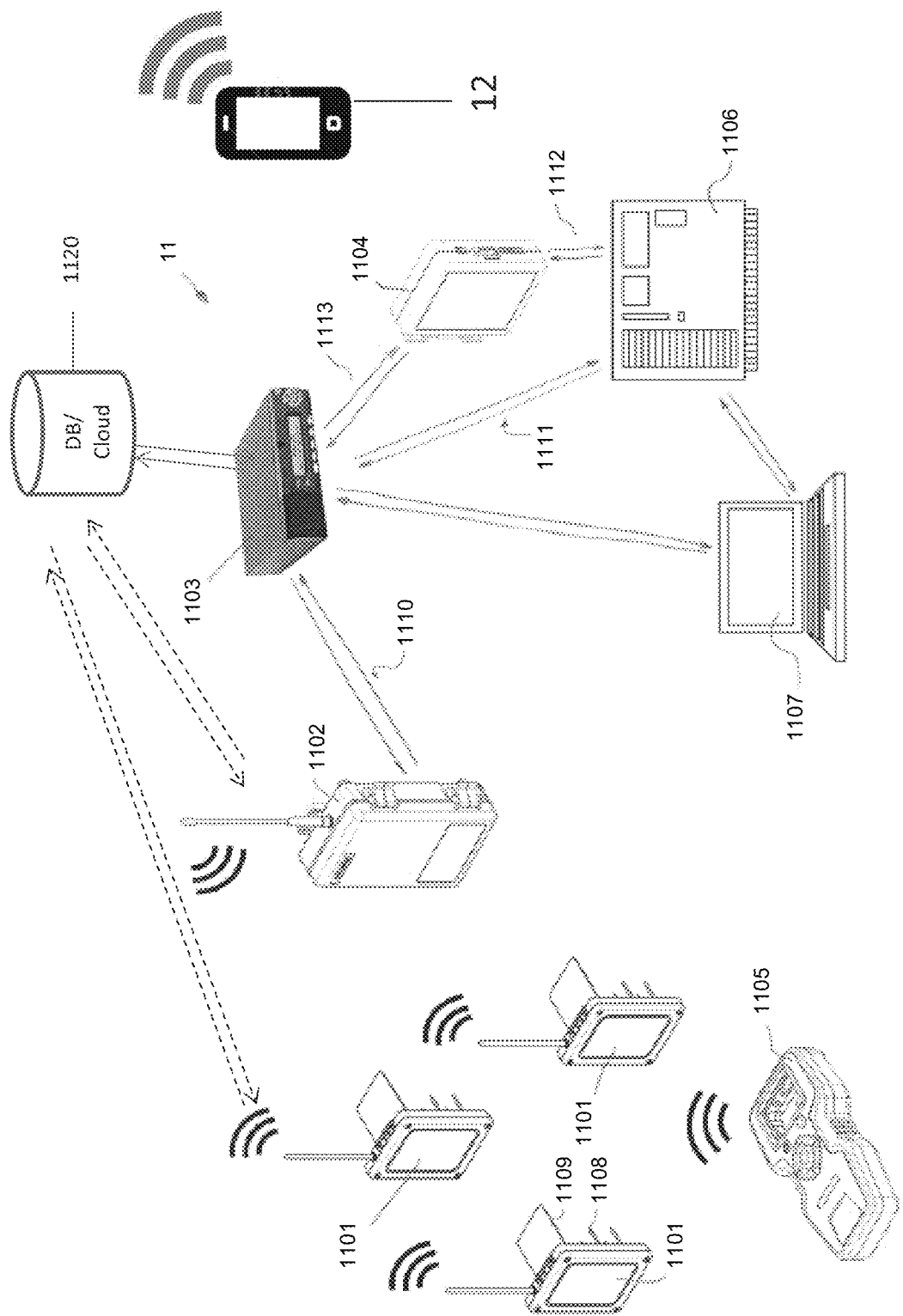
FIG. 7 illustrates a further system comprising elements of the present invention.

FIG. 7 shows a system 11 comprising a plurality of detectors 1101 (also referred to as sensors), a receiver 1102, a first detector data processing device 1103 (referred to in certain embodiments as a central detector data processing device or smartbox), a signal convertor 1104 (a 'convertor'), and portable communication devices 1105 and 12.

In this example the first portable communications device 1105 is a dedicated 'handheld' device which communicates, using radio technology, with the receiver 1102. In this example, the second portable communication device 12 is a smartphone phone which does not require a receiver 1102.

The system also includes a database such as a cloud service 1120 and the central detector data processing device 1103 is configured to access the data set from the cloud and retrieve data to be temporarily stored in its memory for processing. Data may be sent from the detectors 1101 to the receiver 1102 and from the receiver 1102 to the smartbox 1103. The smartbox processes raw data to obtain processed values. For example, a detector (i.e. a sensor) can measure a property of a substrate, the smartbox processes or translates the raw data and the data is sent to the cloud to be stored as logged data.

As can be seen from FIG. 7, data communication is two-way. Accordingly, data may be sent from the smartbox 1103 to the cloud 1120 or from the cloud 1120 to the smartbox 1103. It will be appreciated that, in alternative embodiments, data may be sent to the cloud directly from the receiver and/or sensor as shown in FIG. 7. In such embodiments, the functionality of a smartbox as described herewith may be performed remotely from the grower's site, for example in a cloud service. In other words, it is the functionality of the smartbox device rather than the device itself that is important, regardless of whether this is implemented in a device at the grower's site or remotely.

In this example, the system includes both a smartphone 12 and a dedicated handheld device 1105 although it will be appreciated that only one portable communication device may be used to alert a user. It will also be appreciated that the alert triggered by the application may be transmitted to a user by any means, without using a portable communication device, for example, by email or a message sent to a user terminal such as a user's PC.

A portable communication device however has the advantage of ensuring a timely alert reaches the user. The smartphone 12 may communicate wirelessly to the cloud 1102 and is capable of running applications including graphical user interfaces as will be described in more detail below. The handheld device requires a receiver 1102 and may download data stored from a sensor 1101. In alternative embodiments, the smartphone may act as both as a handheld for checking the sensors and as a processing device for running the application according to the invention, alerting the user and displaying graphical user interfaces.

The system can also be connected to a climate computer 1106 for controlling the delivery of water and nutrients in the growth substrates. A user terminal such as a laptop, desktop computer, mobile communication device or other electronic interface may be connected to the system via a physical or wireless network as in 1107. A system of the present invention may comprise some or all of the above elements and their description in relation to this embodiment does not imply that any or all are essential elements, since the invention can be implemented with a sub-set of the described components and/or features.

Each of the detectors or sensors 1101 of the system is configured to be capable of measuring at least one property of the substrate, such as a temperature, a water content, pH level and a nutrient content of a plant growth substrate, when the detector is placed on or in contact with, or at least partially inserted into, the plant growth substrate. Detectors can, in certain systems take a direct measurement of individual nutrients and temperature, and make a calculation of water content, pH level or nutrient content of the substrate for example. However, it has been found to be preferable in the system of the present invention that the detector takes a reading of a related property indicative of the temperature, water content, oxygen content, overall nutrient content, individual nutrient content (such as calcium, potassium, sodium), root parameters, plant parameters or pH levels of the substrate and transmits that property directly to a remote processor, such as a smartbox of a preferred embodiment, such that conversion of a recorded and transmitted parameter can be controlled, managed and carried out centrally, and remotely from the detector or sensor 1101. In general electrical conductivity (EC) may be used as a setpoint for overall nutrient status. Individual measurements on nutrients may be important however to detect the individual balance elements, for example to establish how the concentrations between ammonia and nitrate relate.

The detector may also be arranged to determine other relevant plant parameters such as extrudates or microorganisms e.g. via mass-spectroscopy. Plant parameters may refer for example to physical root parameters such as length and width, but also to pH around the roots (relevant for uptake processes), chemical oxygen usage by roots, or production of ethylene as growth status for example. Plant measurements may include, for example, photosynthesis, leaf area, length, stem thickness, head thickness, EC in the stemflow.

Examples of properties indicative of the above properties can include: capacitance being indicative of water content or electrical conductivity being indicative of nutrient content. Properties indicative of global nutrient levels, or of individual nutrient levels, may be derived from electrical conductivity values. Air content in the slab can also be measured indirectly, since it is related to the slab volume, which may be known, its fibre density, water content and nutrient content. The air content can therefore be calculated once these properties have been measured. For example, if a slab has a volume of 11 litres, in some examples, 2% is fibres, and 98% is pores. If the water content is 60%, a pore volume−water volume is 98%−60%=38% air content. 38% of 11 litres=4.18 litres air. Temperature may be measured directly and transmitted directly, needing minimal or no conversion after transmission from the detector or sensor.

Transmission of indicative properties and calculation of the actual values in the smartbox or first detector data processing device, or in the handheld device of the system of the invention can help to keep the performance requirements and related costs of the electronics in the detector or sensor 1101 lower than if calculations are carried out in the detector or sensor itself. Further, this can allow central management of any calibration factors for correction and conversion which may be necessary and further allows improved accuracy of the measurements and conversion process of the system as a whole. This can also help to reduce a burden on a power source of the detectors 1101, to save battery life of the detectors where they are battery powered, since less processing is necessary in the detectors, because processing can be carried out in a central control device, which may have a more substantial or longer lasting power source, such as a mains connection, solar, or wind powered source or a more substantial battery, for example. These factors can also help in reducing weight of the detectors 1101. This allows the detectors 1101 to be located on or in a plant growth substrate without needing significant mounting devices or retention means to hold the detector in place.

Data of the preferred embodiment sensors or detectors is broadcast at intervals, preferably every 3 minutes on a certain frequency using, RFID-UHF (Mhz/Ghz) bands which are known means for electronic communication. Useful time intervals can vary between, for example, 20 seconds and 10 minutes, depending upon the frequency of updates required and user requirements.

In certain embodiments, the detector may comprise a plurality of elongate probes 1108, which are configured to be inserted into the plant growth substrate to measure its properties. The detector may further comprise a guide element or plate 1109, which is arranged to maintain the elongate probe 1108 at a set distance from a surface of the plant growth substrate, which may be a substantially upper surface. The use of limited electronics, a light-weight power supply and a simple mounting mechanism allows the detector or detectors to be easily transportable and therefore easily deployed to multiple locations in a plant growth area such as a green house or irrigation area with minimal effort and minimal re-mounting steps to be carried out.

The detectors or sensors 1101 may be arranged to communicate over a communications link with a central detector data processing device 1103, known in the preferred embodiment as a smartbox, or with the portable communication device described in relation to the system. The communications link may be by direct wired connections. However, it has been found preferable to use a wireless connection, since this allows easy relocation of the detectors and minimal installation effort. The wireless communication may be direct with central detector data processing device 1103, where the central detector data processing device has wireless communications capabilities. However, it may be preferable to provide a separate wireless receiver 1102 to receive wireless communications from, and optionally send wireless communications to, the detectors 1101. The receiver 1102 may be connected via a physical link such as Ethernet, cabled connection, or via a wireless link 1110 to the central detector data processing device 1103. Both the receiver and the smartbox can be provided with a battery pack to provide power. This may be built in to the smartbox central detector data processing device 1103.

The wireless communications may be provided by known technologies as are used commonly in electronic communications, such as RFID-UFH bands in the range of 800 to 1000 MHz or 2.4 GHz. However, alternative wireless communication means may be used, such as IEEE 802.11, for example. The physical connections between various devices in the system may be through Ethernet connections over copper wire, fibre optic and any other suitable communications means as are generally known in electronic and computer related communications, including mobile data communications networks if necessary.

The central detector data processing, smartbox, device 1103 contains at least one processor and at least one memory. The memory may store, either in a database or as separate data files, or in any suitable data storage means, one or more data files relating to one or more irrigation strategies or cycles. Preferably, the data set is collated over time as logged data and stored in a database such as cloud service 1120. Preferably the smartbox device 1103 is configured to access the data set from the cloud and retrieve data to be temporarily stored and in its memory for processing.

The data set may provide relationships between measured parameters provided by the detectors and desired irrigation outputs also referred to as desired irrigation parameters. The desired irrigation outputs represent parameters which define an irrigation strategy. For example, irrigation outputs may relate to a desired irrigation cycle, a simple on/off indication for irrigation equipment or may contain further details such as a flow rate of irrigation, an irrigation cycle defining lengths of on and off periods for an irrigation cycle and a length of time over which the irrigation cycle should be applied. A preferred embodiment includes 1 database, but may contain more, for example 2, 3 or 4 databases. A first database holds raw recorded parameters, while a second database might hold translated or converted parameters after conversion, for properties such as water content, electrical conductivity and temperature.

One or more, preferably two models are also held in a memory of the device 1103. A first model may be known as a substrate model and contains instructions for converting raw detector or sensor output data to real values for water content, electrical conductivity and temperature. A further model held in the device 1103 may be referred to as an irrigation model, and contains instructions for calculating new values, such as calculating the decrease in water content between 2 irrigation cycles, or arranging data for analysis, presentation or comparison so that further irrigation cycles for the substrate can be output. The models can also be combined in a single database. Other outputs from the central detector data processing device may include aggregated data collected from the detectors over time and/or displayed in relation to differing locations of the or each detector.

The processor of the data processing device 1103 may therefore be configured to receive detector output data relating to parameters measured by the detectors, to process the detector output data to determine one or more of a temperature, water content, pH levels and nutrient content of the growth substrate and to output aggregated detector data, a desired irrigation strategy or an irrigation instruction.

The first ('central') data processing device 1103 may also be connected to either or both of the climate computer 1106 and the user terminal 1107. The climate computer may be configured for monitoring and controlling various climate factors in the growing area, such as radiation, temperature, humidity and the like. The connection 1111 between the processing device 1103 and the climate computer 1106 may be a wireless, physical, or Ethernet or other computer network connection. However, in some cases, the central processing device 1103 and climate computer 1106 may be integrated in a single device and may merely represent separate logical computer programs running on a common hardware device. In this case, communication between the two elements may simply be via internal communication means in the hardware, such as a processor bus or memory in the hardware device or by passing functions and variables between logical computer processes running on the device. As such, central detector data processing means 1103 and a climate computer may be implemented as separate logical processes on a common computing device. The present system can therefore function alongside a climate computer so that the present system controls irrigation and/or fertigation, while the climate computer may, if necessary, control climate conditions such as heating, ventilation, and/or air conditioning.

In the alternative it is, in certain circumstances, necessary to communicate with a climate computer via analogue input and output connections. In this case, a digital to analogue convertor 1104 may be necessary, which may be connected to the central detector data processing device 1103 via a physical connection, or may be integrally formed in the data processing device, and may be configured to convert digital values output from the central detector data processing device into analogue electronic output signals, which are then communicated to the climate computer via an analogue interface 1112, after passing via a digital interface 1113.

A user terminal 1107 may be connected to, or logically integrated with as described above, one or both of the climate computer 1106 and the central data processing device 1103. The user terminal may comprise a screen and input means, in the form of a keyboard, touchscreen, audio input means or other human-machine interfaces as are well known for electronic devices. The user terminal can be used to configure the central detector data processing means, by uploading data files to the processing means, for defining relationships between detector inputs and irrigation control outputs and for applying general configuration settings to the processing means. Irrigation steering is often based on setpoints such as: set start time to start irrigating; stop time; dripping speed, cycle length and/or frequency; set interval times (rest time) before recommencing irrigating.

The system of the present invention allows one or a number of different sensor inputs from a range of areas in the growing area to be measured, converted and combined in a single system, which can output a desired irrigation or nutrient input control to start or stop irrigation or nutrient input and adapt irrigation or nutrient input cycles and frequencies and the like.

The system may further include a portable detector communication device 1105, also known as a handheld device, since it may advantageously be configured to be portable in a single hand of a user, to allow easy transportation of the device and another item, such one or more detectors 1101, in a second hand of the user. Detectors 1101 may often be located at remote or disparate locations around a greenhouse or irrigation area, which can on occasion cover several hectares. It is therefore often necessary for a user to travel significant distances to reach the detector to either check its configurations or installation or to move it to a new location. It is therefore advantageous to have a light and portable hand held device to assist with checking the installation, calibration, configuration and general status of detectors in the system. This avoids the need for multiple return trips from detectors back to the user terminal or central processing device to change aspects of the installation and then check the configuration or outputs. The hand held portable device is therefore provided with its own power supply, such that it can be carried independently. It also includes an integral display, such that outputs or status information from any of detectors 1101 can be displayed on the device. The device may be durable and its body made from an impact resistant material to prevent damage when it is being used in agricultural or horticultural environments. The device is generally configured so that it is easily portable by a user who may need to travel long distances on foot to reach detectors in the system. However, the hand held device does need to include certain aspects of functionality to facilitate installation, checking and set up of the detectors and the system as a whole.

The central data processing means needs to be aware of a number of factors for each detector. The portable communications device may be used to read, input or communicate any or all of these to the central detector data processing (smartbox) device. These include: details of its current location, a date and or time at which the detector was placed in its current location, any settings of the detector regarding what properties it is set to monitor and transmit, a power status of a power source of the detector, connection status of the detector to the central processing device, checking of sensor reading output, of an access point to which the sensor or detector is allocated for system communications, review of raw output data, or properties of a substrate to which the detector or sensor is applied, such as material, type and dimensions, and any other relevant sensor data.

Accordingly the portable communications device will preferably include the following functions. It will be able to either determine its own location or receive user input relating to a location of the device and/or a related detector. It will be able to receive at least an identifier of a detector with which it is communicating, either by user input, by direct communication with the detector 1101. This may include optically reading a bar-code, alpha-numerical identifier, QR-code or other optical or visual identifier or reading an RFID or near field communications (NFC) identifier. Preferred embodiments use RFID-UHF bands selected accordingly in a frequency range typically from 800 to 1000 Mhz or 2.4 GHz. The identifier may include a serial number and/or a product code of the detector or sensor. The portable communications device may be configured to relate its location data to a particular detector and to transmit the location data and detector identifier to the central data processing device, so that the central data processing device can store a record of a location of each detector, which can be associated by the central data processing means with the parameters which the detector outputs over time. The portable communications device may also be capable of placing the detector in a testing mode.

In preferred embodiments, many aspects of functionality will be common between the smartbox central detector data processing device and the handheld device. These include: displaying available or connected nodes (sensors or detectors) to a user and data relating to the detectors or sensors, selecting nodes (sensors or detectors) and testing for output, communications functionality etc.; verifying accurate sensor readings; setting a node location; verifying connection of the sensor with the central data processing means; addressing nodes to the right access point/central detector data processor; calculating water content (WC), electrical conductivity (EC) and temperature values.

The portable communication device (e.g. a dedicated handheld device or smartphone running a dedicated application) may also have additional features such as: recording measurements in blocks of multiple, measurements; basic statistical analyses of results can be done, for example, per block the average values and standard deviation can be calculated; a text based help function may be included and variable languages can be set; power status readouts can also be made.

The dedicated handheld device 1105 in combination with at least one sensor 1109 may be referred to as a 'meter'. The handheld device can communicate with one detector at the time. Unlike a smartphone for example, a handheld device operates stand alone and is not connected to the network. A handheld device can take single measurements, multimeasurements, log data taken over a period of time (e.g. a number of days). The logged data can then be collated and processed and displayed as a function of time in a suitable application on any suitable device such as for example on a PC, tablet, mobile phone etc.

The central detector data processing device 1103 or smartbox can send data to the database or cloud 1120 (as shown in FIG. 7, the communication being two-way). Examples of user interfaces including graphs based on such data are shown in FIGS. 8 to 11 described below. The user interfaces are preferably displayed on a portable communications device, preferably a wireless device such as a smartphone or tablet for example although they may also be displayed on any user terminal running the application such as a PC.

Figure 8:
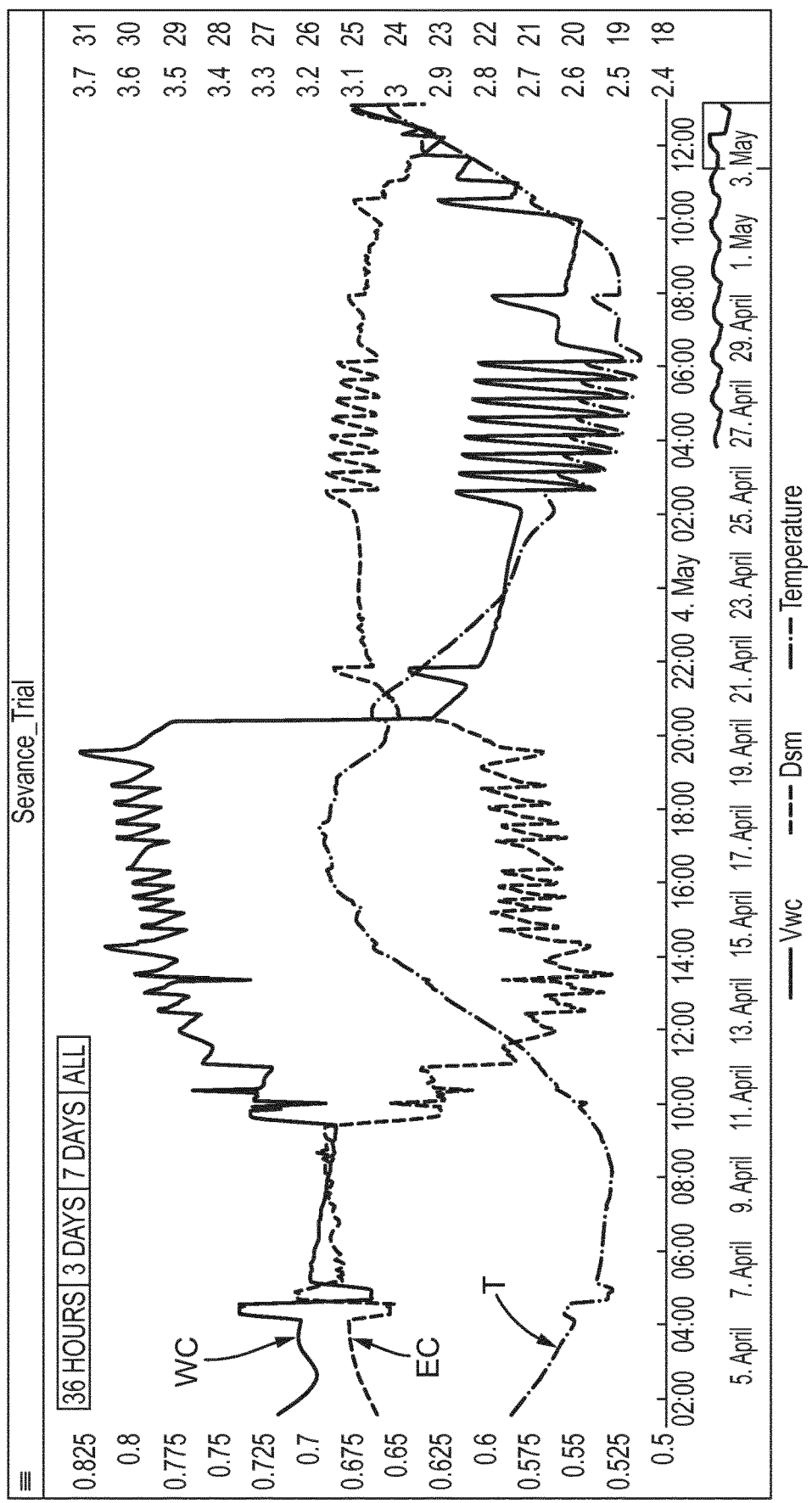
FIG. 8 shows an example of a graphical user interface showing measured water content, electrical conductivity and temperature levels.
Figure 9A:
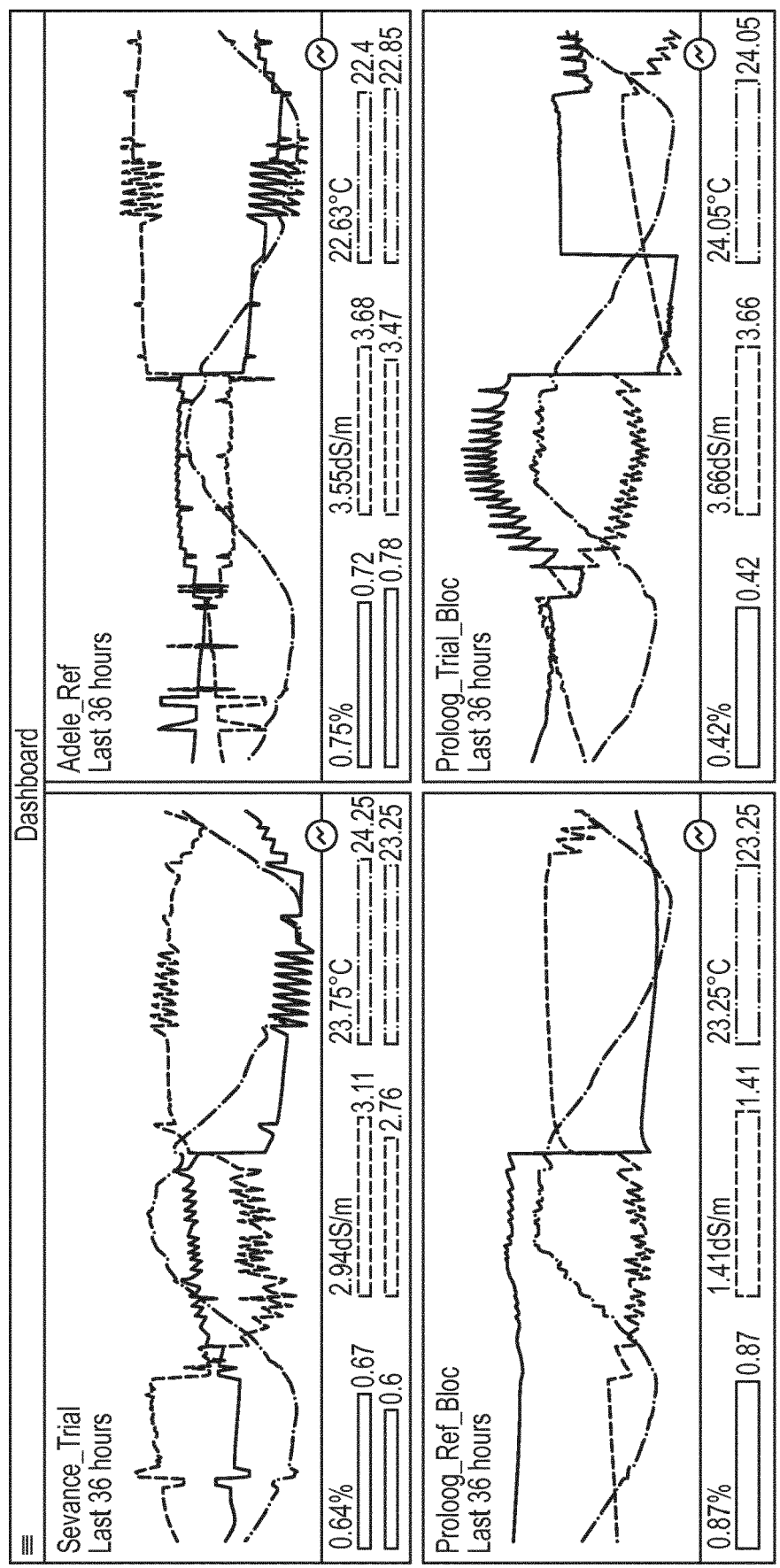
FIGS. 9A and 9B show further examples of graphical user interfaces.
Figure 9B:
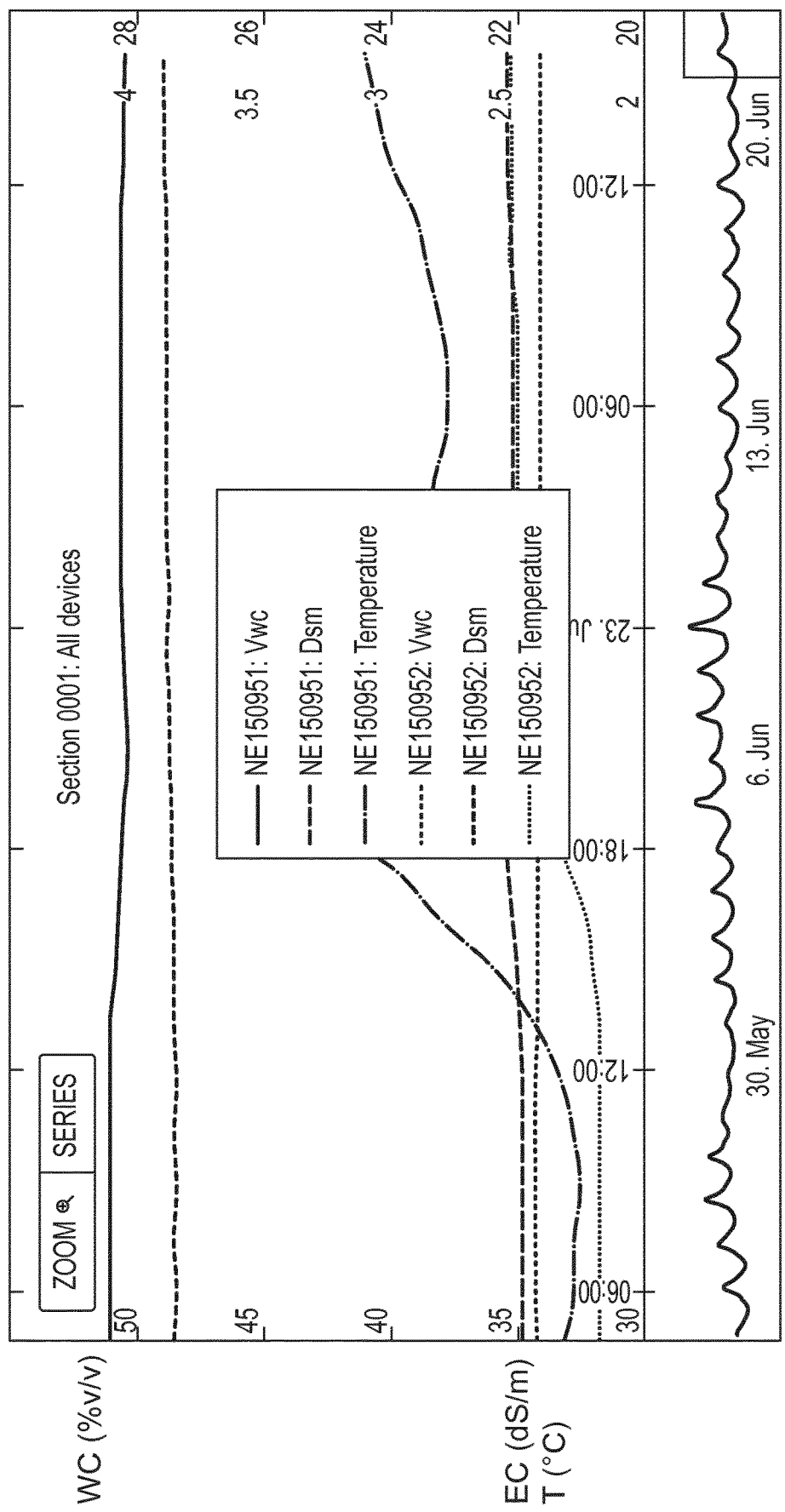
Figure 10:
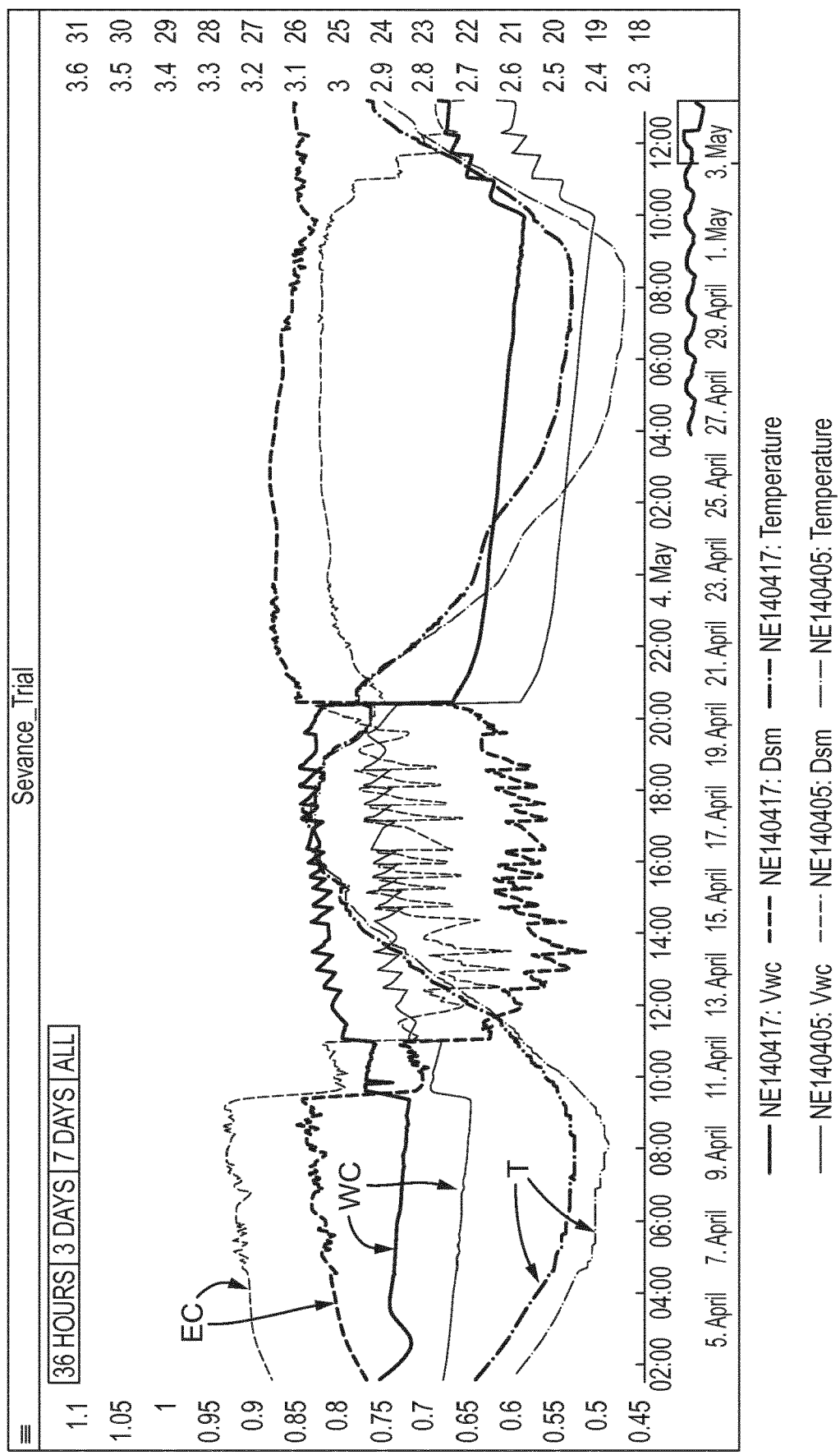
FIG. 10 shows an example of a graphical user interface showing multi-measurements for water content, electrical conductivity and temperature levels.

FIG. 8 shows an example of measurements of electrical conductivity (EC), water content (WC) and temperature (T) as a function of time, each curve representing the average of the respective measurements received from one or more detectors deployed in a 'section' of the grower's site). FIG. 9A is a representation of a 'dashboard' function of the graphical user interface, with graphs of average data obtained over 36 hours on various sections. The date is received from one or more detectors. In the example of FIG. 9B, data of two sensors in a section are displayed next to each other. WC is expressed in % WC based on volume, EC is expressed in dS/m (deca Siemens per metre) and T is expresses in degrees C. in this example. As shown in FIG. 10, the WC, EC and temperature detected at two locations in the greenhouse are displayed. In preferred embodiments, a system comprises at least three detectors.

In preferred embodiments, a portable communication device such as a smart phone or tablet automatically displays the averages and the distribution of the values per series, for example per watering section. Advantageously, this enables reliable adjustment of setting for optimisation of the irrigation strategy. Measurements are usually performed on around 20 slabs and an average measurement is generated for a representative slab, which may be referred to as a reference slab. The reference slabs in a greenhouse can easily be determined using multi-measurements.

The dedicated handheld device may also be configured to communicate with a detector to change a mode of the detector from periodic output to continuous output. Periodic outputs may be used to preserve battery life of the detector, while continuous output may be used for full finding or status checking of the detector.

For example, in some preferred embodiments, the meter may be provided with a logging function in which measurements are taken at preset time intervals. For example, a user can easily adjust the time intervals at which measurements are to be carried out in a slab. In preferred embodiments, the meter can take and store 2300 or more measurements carried out in a slab. This gives reliable information regarding the WC, EC and temperature values as a function of time (i.e. curves), taken over a period of time determined by a grower for example. Examples of such curves are shown in FIGS. 8, 9 and 10. Long-term use of the meter without interruptions or failure also contributes to stable and reliable measured data. Based on these data, the irrigation strategy can be adjusted using a method according to the invention in order to optimise cultivation.

A grower can input setpoints, for example on water content to establish the conditions under which an alert is triggered. For example a grower can set the system to get an alert if the water content drops 3% (EG). The system can use the logged data to predict the parameters of a section on the current day for example. Therefore the system may used data logged from the day before for example to make a prediction that indicates where the water content will end if the weather conditions are similar. This can be displayed from the sunset on for example.

Figure 11A:
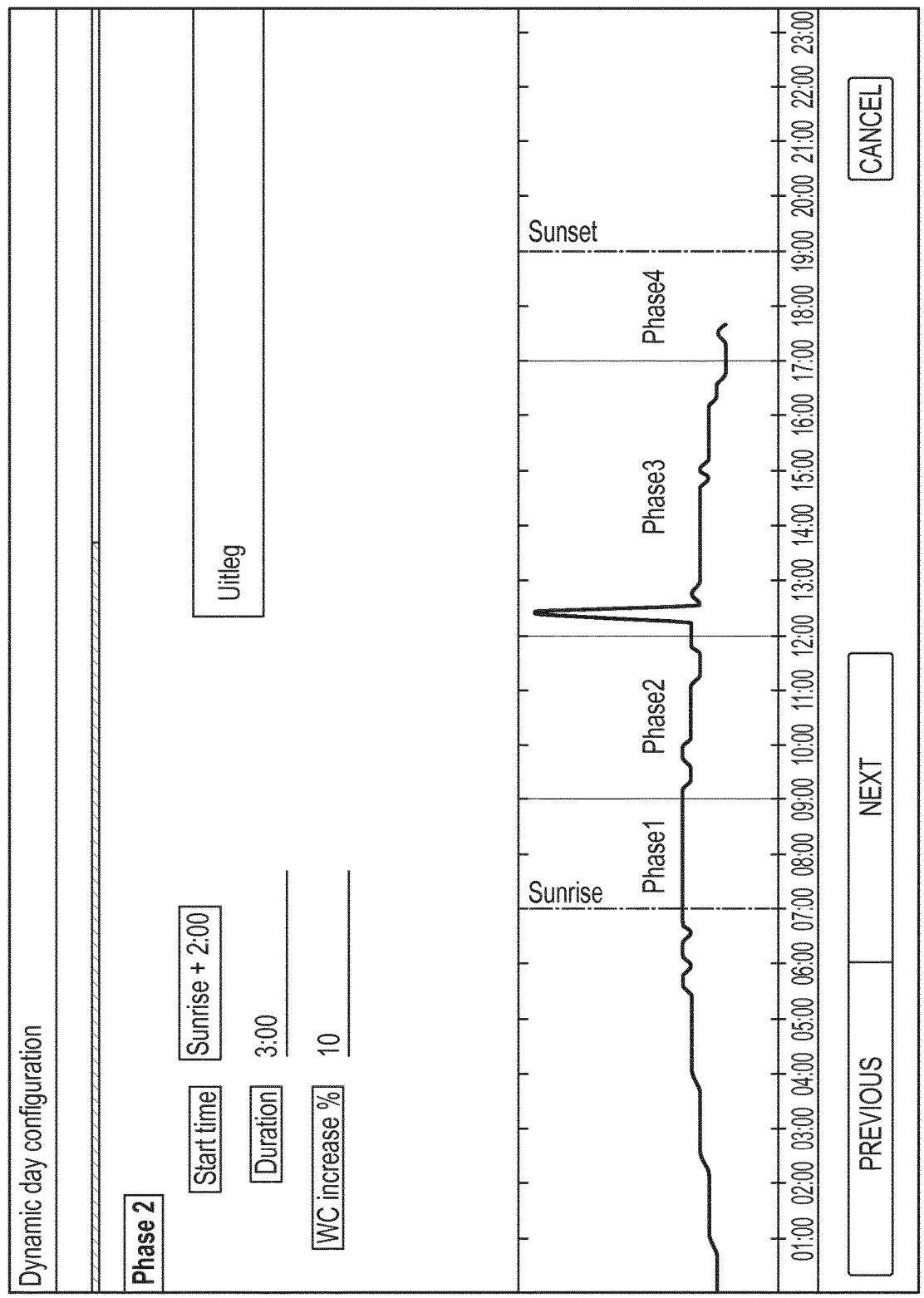
FIG. 11A is an example of a graphical user interface representing day dynamics in a system wherein a setpoint may be input by a user.
Figure 11B:
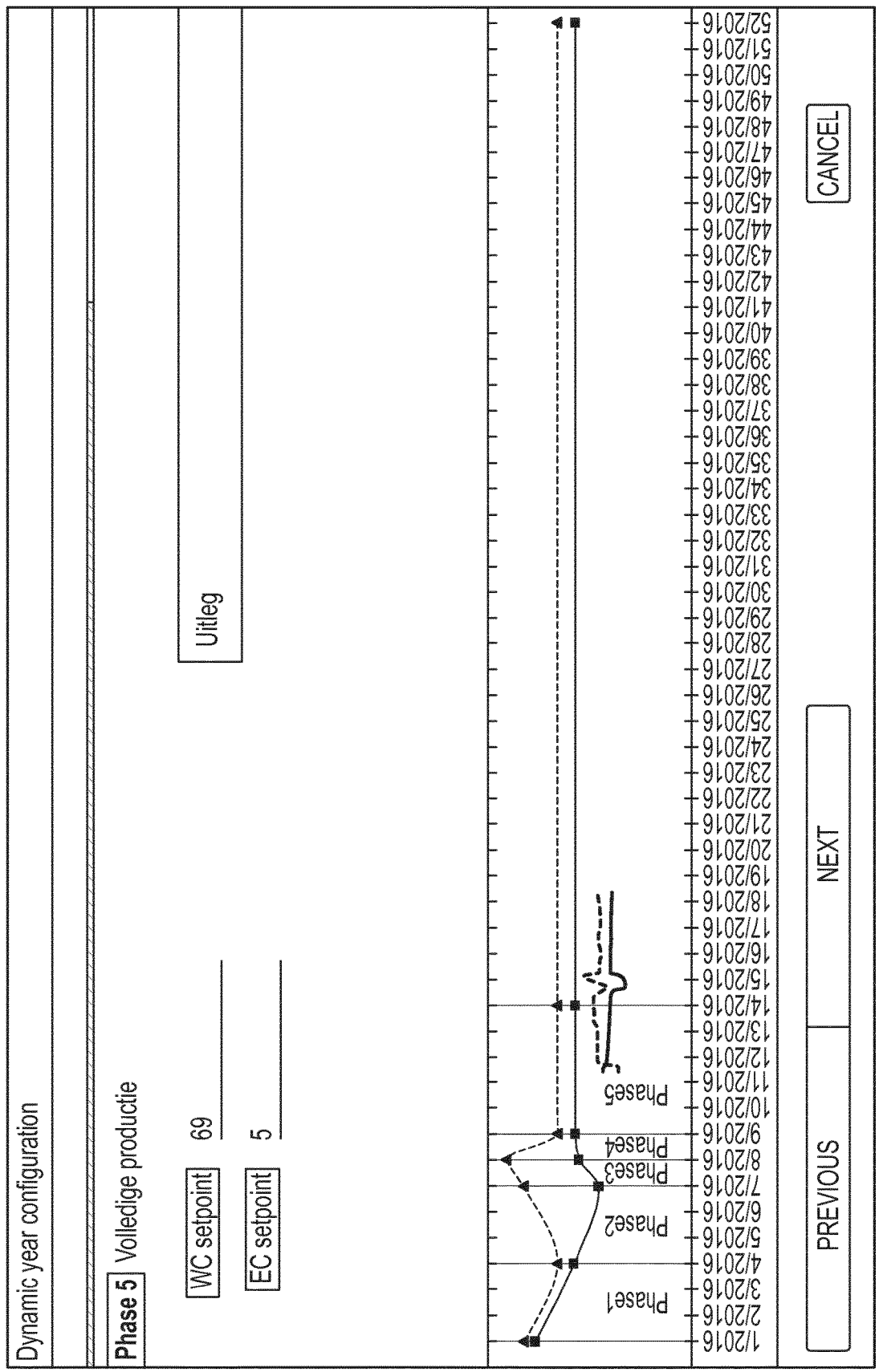
FIG. 11B is an example of a graphical user interface representing year dynamics in a system wherein a reference (i.e. target) line is displayed alongside an irrigation steering curve.

FIGS. 11A and 11B show examples of graphical user interfaces wherein a user can input setpoints to control the irrigation strategy, based on daily and yearly dynamics respectively. Setting a setpoint may be done on the WC and/or EC levels for example. With reference to FIG. 11A, a WC setpoint or threshold is set at 10% for water content increase in a day (daily dynamics). For example, the % decrease may be between 0.5 and 30%. Duration may be set in hours and/or minutes.

Figure 11C:
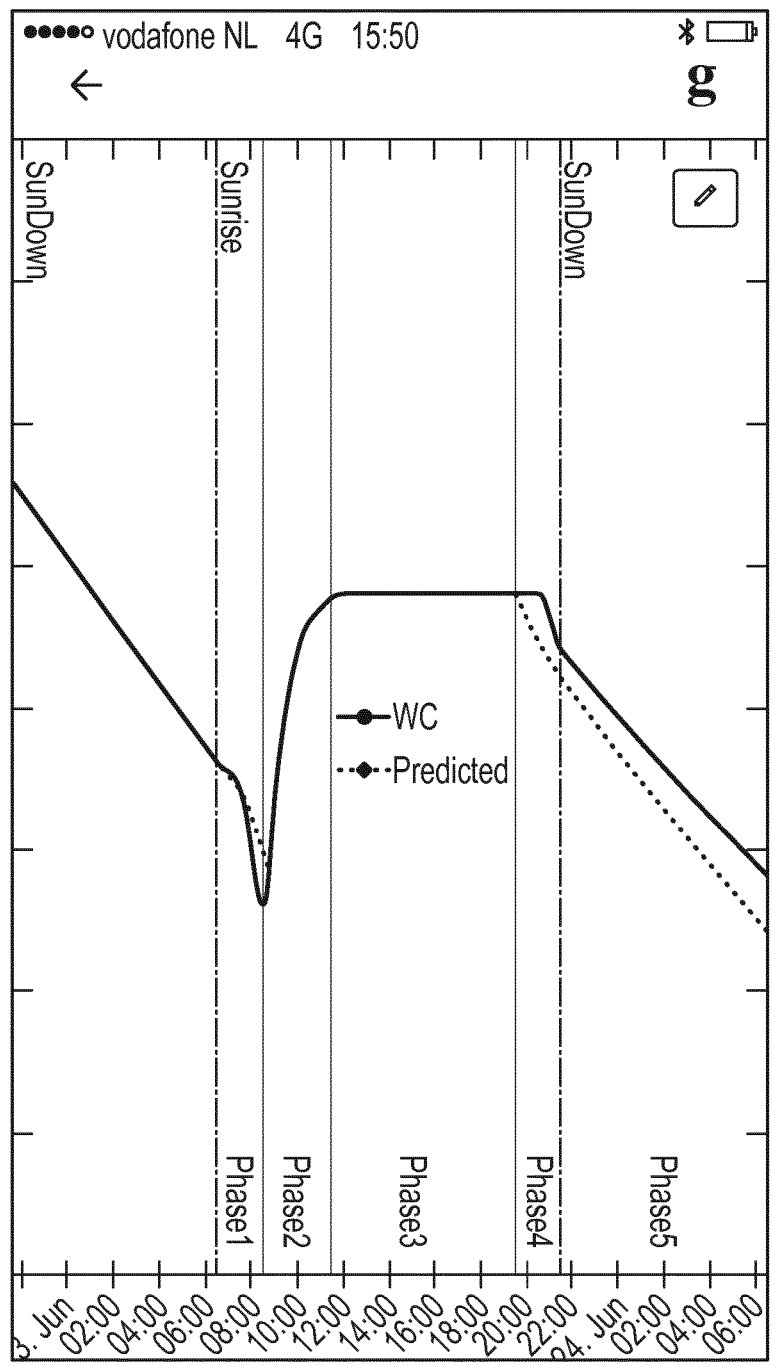
FIG. 11C is an example of a graphical user interface showing predicted lines being plotted based on certain setpoints.
Figure 11D:
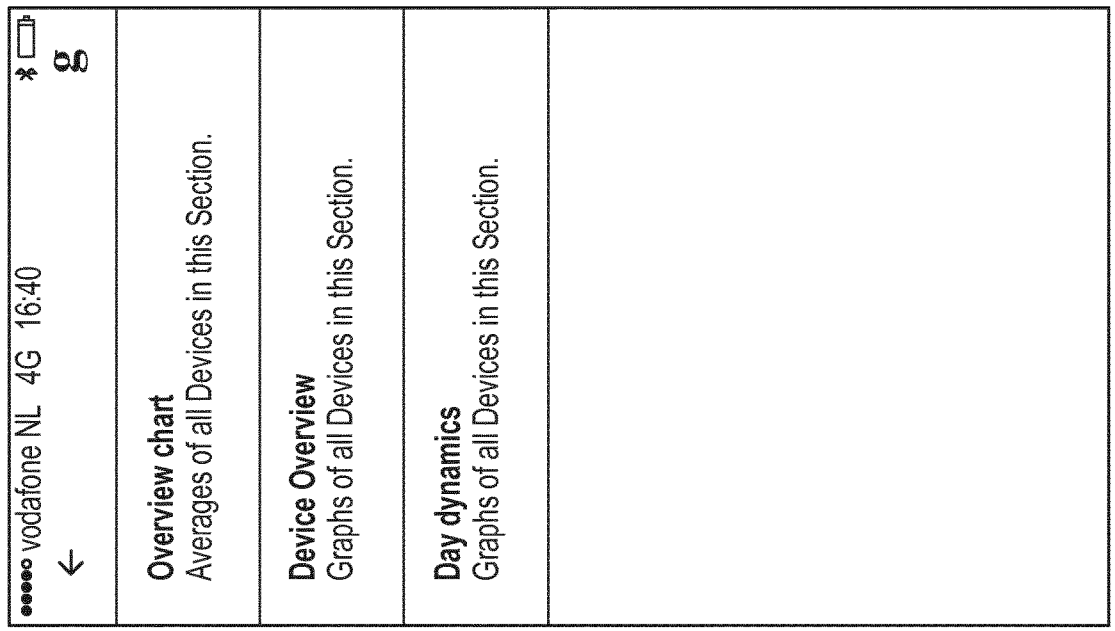
FIG. 11D shows an example of alerts.
Figure 11E:
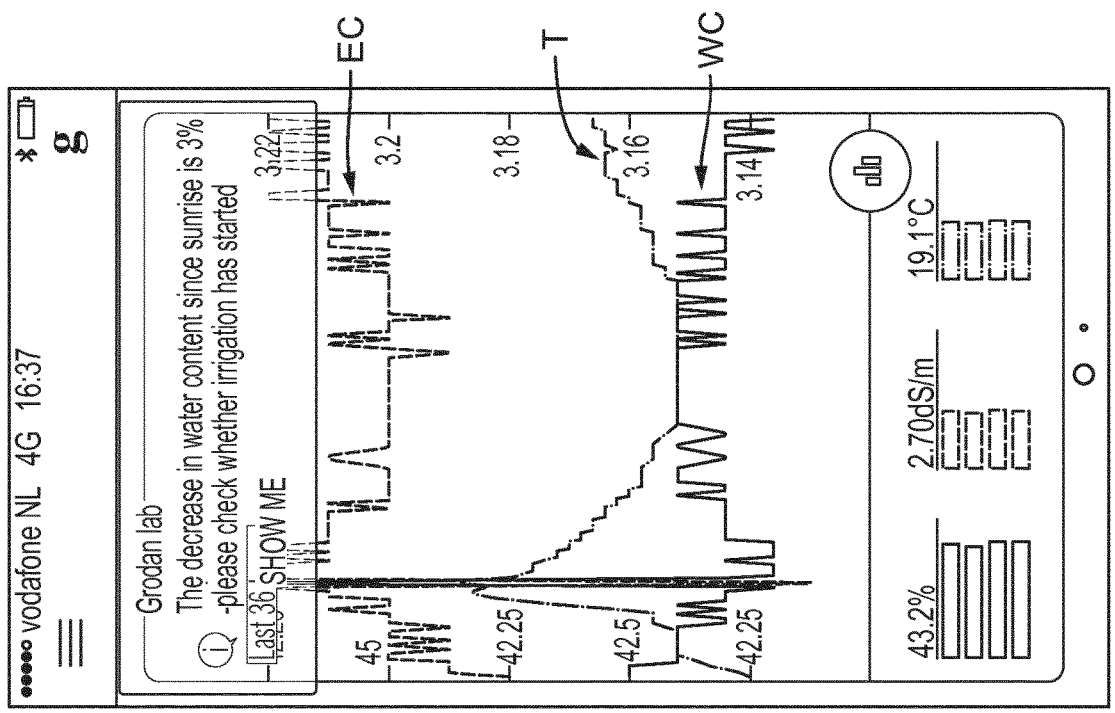
FIG. 11E shows another screenshot of a graphical user interface being run on a smartphone.

FIG. 11B shows in an example of a setpoint generator for yearly dynamics, whereby a grower may set desired values of EC and WC in certain weeks of the year. In FIG. 11B the weeks shown represent weeks from the start of the crop (rather than calendar weeks), the week of the start of the crop being labelled week 0. Next to the setpoints set by a grower, it is possible to display an advised setpoint for example received from an analytical platform or advisor. It will be appreciated that setpoints may vary per crop type or slab type for example. The dotted curve marked by triangles represents the target EC, while the dotted curve marked by squares represents the target WC. The continuous lines respectively represent the actual measured EC and WC levels (as processed data from the smartbox). In FIG. 11C, predicted lines (diamonds) are plotted based on certain setpoints. An example of alerts is given in FIG. 11D. FIG. 11E shows another screenshot of a graphical user interface being run on a smartphone. In FIG. 11E, a basic 'menu' of a graphical user interface is shown, whereby the user can select between graph types to be displayed (section, individual sensors, day/year dynamics).

In preferred embodiments, the system is connected to the climate computer and can advantageously report data in graphic form, either immediately or continuously. For example, data may be sent directly to the cloud or climate computer every 3 minutes and thus data is sent continuously. Data may be also displayed in graphs immediately, when received.

A portable communication device (be it a dedicated handheld device or a smartphone device as described above) may comprise a communications interface for communicating with the detectors. The device may further be configured to communicate with a detector to determine an identifier of the detector, to combine the detector identifier with location information and to forward the information to a central detector data processing means. For example, location information may be input to the handheld device 1105 by a user, or may alternatively or additionally be determined by the device itself using GPS hardware, or other location determining means. The location determining means may include means arranged to optically read a bar-code, alpha-numerical identifier, QR-code or other optical or visual identifier, a RFID or a near-field communications (NFC) device located at the device's location, and indicating information concerning the location. Location information may comprise map coordinates or GPS coordinates or column and row information relating to the location of substrates in the growing area. Location information may further include greenhouse number or code, irrigation section code, hood code, row number and slab number. In a preferred embodiment location information includes as a minimum an irrigation section code and row number among others. The device may be further configured to take measurements of the output of the detector, to display these to a user and to optionally forward them to the central data processor over a further communications link. The device may be configured to, in response to user input, place the detector in a set-up mode or a testing mode and to transmit results of the status change or of results of a test to the central detector data processing means over a further communications link. The communications link may be physical or wireless, however, the use of wireless communications reduces installation and set-up times and can reduce material costs where long distances are involved.

The portable communication device may be a standard piece of electronic communications equipment such as a PDA or mobile telephone such as a smartphone and therefore the invention may be embodied in a computer program product containing instructions which, when carried out by a processor of an electronic communications device comprising remote communication means, configure the device for establishing a communications link with the detector, to interrogating the detector to determine a detector identifier, to associate the identifier with configuration information of the detector and to transmit the configuration information to a central detector data processing means. The configuration information may comprise location data, detector configuration data, detector status data, such as power source information, time in use, in addition to the functions and parameters discussed above in relation to the handheld device.

The data collated from growers is uploaded to a cloud and may be stored on a server to be processed within an analytical platform for example. This enables advisors to view grower's data remotely on a remote device such as a laptop, PC tablet or smartphone for example. Analytical platforms may implement the steps of data visualisation, data analysis, integration of data and process control. Preferably, the uploaded data is collated over time and evaluated. For example, the results of analytical evaluation performed by experts or advisors may be presented in reports to be provided to users automatically. In preferred embodiments, setpoints and calculations may be uploaded automatically to the grower's climate computer so that automatic steering (i.e. control of irrigation) is advantageously enabled. Analysed data may be sent from the cloud to a climate computer and/or any other remote devices for example to steer or correct the individual irrigation strategy.

The logged data (also referred to as platform data) may be additionally collated from any measurement devices or climate computers, to form an integrated data on the platform—the platform being visible to the remote devices. Platform data may also include data such as climate computer set points and parameters, crop registration data, and other data relevant to the growers.

Variations and modifications to the embodiments described above will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term 'comprising' does not exclude other elements or steps, the term 'a' or 'an' does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A system for controlling plant growth conditions in hydroponic growing systems, the system for controlling plant growth conditions comprising:
   at least one detector for measuring at least one property of a plant growth substrate;
   first and second data processing means;
   data storage means; and
   the at least one detector being arranged to measure a property or properties of the plant growth substrate and to transmit a detector identifier and the measured property or properties over a communications link to the first data processing means;
   the first data processing means being arranged to:
      hold in a memory predefined irrigation data defining a relationship between:
         plural values for one or more of temperature, pH level, water content, nutrient content, oxygen content, and plant parameters of the substrate; and
         plural desired irrigation parameters;
      process measured properties received from each detector to obtain processed properties of the substrate;
         provide an output indicative of a desired irrigation input for the growth substrate, based upon the processed properties and the predefined irrigation data; and
      send processed data, including the processed properties, to the data storage means, the data storage means arranged to store the sent data as logged data;
   the second data processing means being arranged to:
      receive data from the data storage means;
      calculate predicted properties of the substrate based on the logged data;
      determine a difference between the processed properties of the substrate and the predicted properties of the substrate;
      receive an alert condition input for outputting an alert based on said difference;
      adjust the alert condition to an optimum alert condition, the optimum alert condition steering growth conditions in the plant growth substrate to bring the conditions in line with conditions of an optimum irrigation strategy and being obtained by an analytical evaluation of the logged data; and
      output an alert when said difference meets the adjusted alert condition.

2. The system according to claim 1, wherein the second data processing means comprises display means arranged to display the processed properties of the substrate and the predicted properties.

3. The system according to claim 1, further comprising a portable communication device.

4. The system according to claim 3, wherein the portable communication device comprises the second data processing means.

5. The system according to claim 3, wherein the system further comprises a receiver in communication with the portable communication device and the first data processing means.

6. The system according to claim 5, wherein the receiver is in communication with the data storage means and is configured to receive data from the at least one wireless detector and send the received data to the data storage means.

7. The system according to claim 3, wherein the portable communication device is further arranged to control an irrigation input to the plant growth substrate based upon the irrigation input parameters for the growth substrate provided by the first data processing means of the system.

8. The system according to claim 3, wherein the portable communication device is further arranged to:
receive detector data from the detector; and
transmit detector data to the first data processing means.

9. The system according to claim 1, wherein the at least one detector is further arranged to transmit a detector identifier and the measured property or properties over a communications link to the first data processing means at a time interval less than 10 minutes.

10. The system according to claim 1, wherein the at least one detector is further arranged to transmit a detector identifier and the measured property or properties over a communications link to the second data processing means at a time interval less than 10 minutes.

11. The system according to claim 1, wherein the at least one detector is further arranged to transmit a detector identifier and the measured property or properties over a communications link to the data storage means at a time interval less than 10 minutes.

12. The system according to claim 1, wherein the first data processing means and the data storage means are part of a single unit.

13. The system according to claim 1, wherein the data storage means is a cloud service database.

14. A method of controlling plant growth conditions using the system according to claim 1.

15. The method of claim 14, wherein the system comprises:
at least one detector for measuring at least one property of a plant growth substrate;
first and second data processing means;
data storage means; and
the or each detector being arranged to measure a property or properties of a plant growth substrate and to transmit a detector identifier and the measured property or properties over a communications link to the first data processing means;
the first data processing means being arranged to:
hold in a memory predefined irrigation data defining a relationship between:
plural values for one or more of temperature, pH level, water content, nutrient content, oxygen content, and plant parameters of the substrate; and
plural desired irrigation parameters;
process measured properties received from each detector to obtain processed properties of the substrate;
provide an output indicative of a desired irrigation input for the growth substrate, based upon the processed properties and the predefined irrigation data; and
send processed data to the data storage means, the data storage means arranged to store the sent data as logged data;
the second data processing means being arranged to:
receive data from the data storage means;
calculate predicted properties of the substrate based on the logged data; determine a difference between the processed properties of the substrate and the predicted properties of the substrate;
receive an alert condition input for outputting an alert based on said difference;
output an alert when said difference meets the alert condition; wherein the second data processing means comprises display means arranged to display the processed properties of the substrate and the predicted properties;
the system further comprising a portable communication device; and
wherein the method further comprising inputting detector configuration data to the portable communication device of the system and causing the portable communication device to transmit the detector configuration information to the first data processing means.

16. The method of claim 14, wherein the system comprises:
at least one detector for measuring at least one property of a plant growth substrate;
first and second data processing means;
data storage means; and
the or each detector being arranged to measure a property or properties of a plant growth substrate and to transmit a detector identifier and the measured property or properties over a communications link to the first data processing means;
the first data processing means being arranged to:
hold in a memory predefined irrigation data defining a relationship between:
plural values for one or more of temperature, pH level, water content, nutrient content, oxygen content, and plant parameters of the substrate; and
plural desired irrigation parameters;
process measured properties received from each detector to obtain processed properties of the substrate;
provide an output indicative of a desired irrigation input for the growth substrate, based upon the processed properties and the predefined irrigation data; and
send processed data to the data storage means, the data storage means arranged to store the sent data as logged data;
the second data processing means being arranged to:
receive data from the data storage means;
calculate predicted properties of the substrate based on the logged data; determine a difference between the processed properties of the substrate and the predicted properties of the substrate;
receive an alert condition input for outputting an alert based on said difference;
output an alert when said difference meets the alert condition; wherein the second data processing mean comprises display means arranged to display the processed properties of the substrate and the predicted properties;
the system further comprising a portable communication device; and
the method further comprising inputting the alert condition input to the portable communication device.

17. The method of claim 14, wherein the comprises:
at least one detector for measuring at least one property of a plant growth substrate;
first and second data processing means;
data storage means; and
the or each detector being arranged to measure a property or properties of a plant growth substrate and to transmit a detector identifier and the measured property or properties over a communications link to the first data processing means;

the first data processing means being arranged to:
   hold in a memory predefined irrigation data defining a relationship between:
      plural values for one or more of temperature, pH level, water content, nutrient content, oxygen content, and plant parameters of the substrate; and
      plural desired irrigation parameters;
process measured properties received from each detector to obtain processed properties of the substrate;
   provide an output indicative of a desired irrigation input for the growth substrate, based upon the processed properties and the predefined irrigation data; and
send processed data to the data storage means, the data storage means arranged to store the sent data as logged data;
the second data processing means being arranged to:
   receive data from the data storage means;
   calculate predicted properties of the substrate based on the logged data; determine a difference between the processed properties of the substrate and the predicted properties of the substrate;
   receive an alert condition input for outputting an alert based on said difference;
   output an alert when said difference meets the alert condition; wherein the second data processing means comprises display means arranged to display the processed properties of the substrate and the predicted properties;
the system further comprising a portable communication device; and
the method further comprising alerting the user by the portable communications device when the second data processing means outputs the alert.

18. A portable detector communication device arranged to provide the first and second processing means of the system according to claim 1.

19. The portable detector communication device of claim 18, wherein the device is a mobile phone.

* * * * *